(12) United States Patent
Guyer

(10) Patent No.: US 6,530,202 B1
(45) Date of Patent: Mar. 11, 2003

(54) DRIVE SYSTEM FOR COMBINE REEL BATS

(76) Inventor: Wayne A. Guyer, 76 N. 600 W., Wabash, IN (US) 46992

( * ) Notice: Subject to any disclaimer, the term of this patent is extended or adjusted under 35 U.S.C. 154(b) by 0 days.

(21) Appl. No.: 09/721,200

(22) Filed: Nov. 22, 2000

(51) Int. Cl.⁷ .............................................. A01D 57/00
(52) U.S. Cl. ............................................ 56/220; 56/226
(58) Field of Search ....................... 56/220, 12.5, 227, 56/226, 14.4, 327.1, 364, 128, 12.4; 460/142, 121, 122

(56) References Cited

U.S. PATENT DOCUMENTS

| 1,770,077 A | * | 7/1930 | Kunz | 56/226 |
|---|---|---|---|---|
| 2,144,905 A | * | 1/1939 | Wallace | 56/226 |
| 3,472,008 A | * | 10/1969 | HurLburt | 56/226 |
| 3,546,863 A | * | 12/1970 | Connolly | 56/226 |
| 3,698,166 A | * | 10/1972 | Fisher | 56/220 |
| 3,771,299 A | * | 11/1973 | Gradwohl et al. | 56/220 |
| 3,940,910 A | * | 3/1976 | D'Acremont | 56/14.4 |
| 4,008,558 A | * | 2/1977 | Mott | 56/226 |
| 4,067,177 A | * | 1/1978 | Tout | 56/226 |
| 4,776,155 A | * | 10/1988 | Fox et al. | 56/220 |
| 4,936,082 A | * | 6/1990 | Majkrzak | 56/220 |
| 5,595,053 A | * | 1/1997 | Jasper et al. | 56/226 |
| 5,987,861 A | * | 11/1999 | Duncan et al. | 56/14.4 |
| 6,170,244 B1 | * | 4/2001 | Coers et al. | 56/226 |

* cited by examiner

Primary Examiner—Robert E. Pezzuto
Assistant Examiner—Árpád Fábián Kovács
(74) Attorney, Agent, or Firm—Krieg DeVault Lundy LLP

(57) ABSTRACT

A drive system for the bat assembly of a combine by which the reel fingers of the bat are rotated from their generally vertical position into a collapsed position and then back into their generally vertical position as the bat fingers traverse from just prior to the header to just prior to the feed auger whereby the reel fingers of the bat can be adjusted to be spaced from the header in all of its positions to accomplish continuous and even feed of cut crop into the auger and yet avoid breakage of reel fingers by the floating header impinging upon the reel fingers during use.

24 Claims, 19 Drawing Sheets

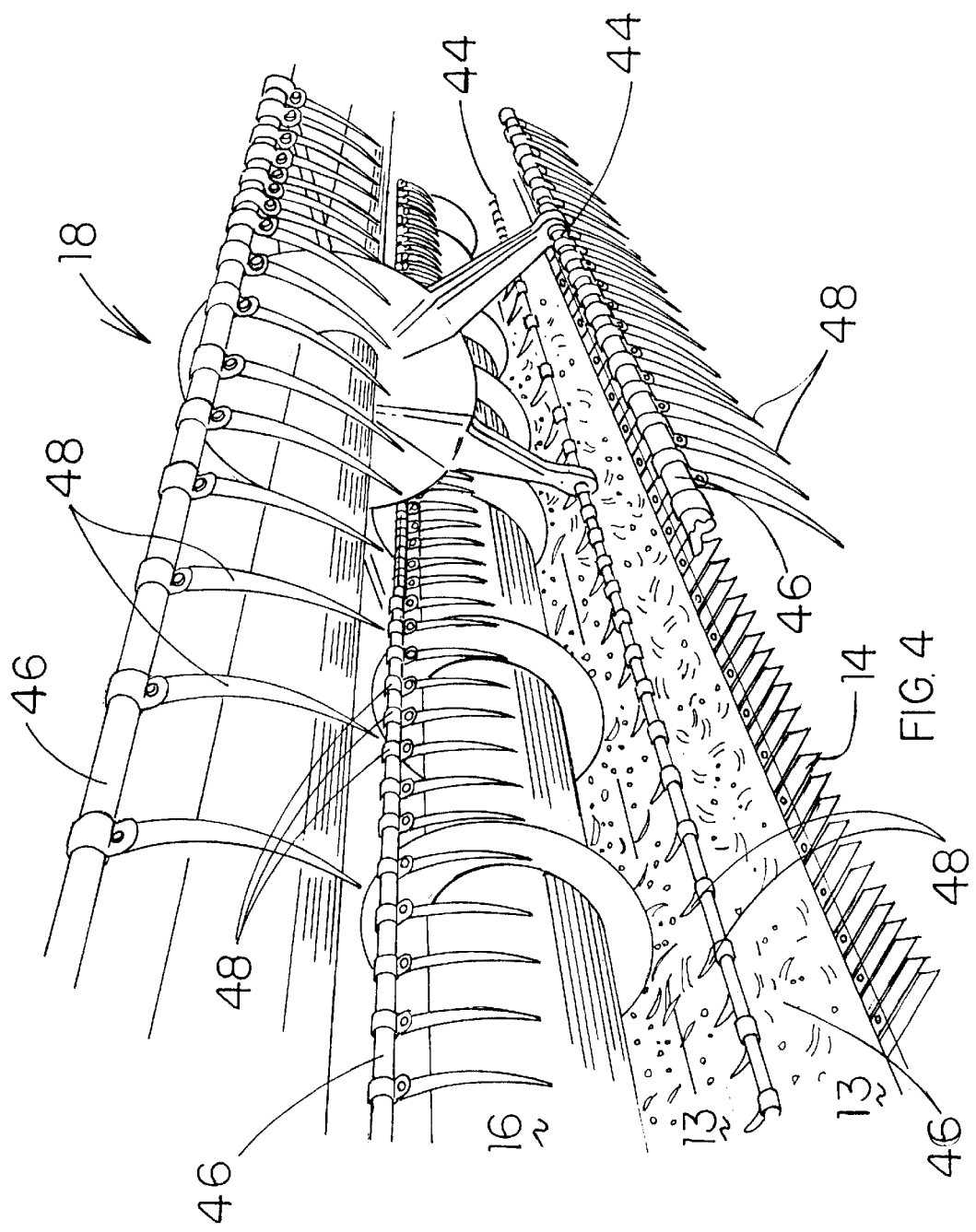

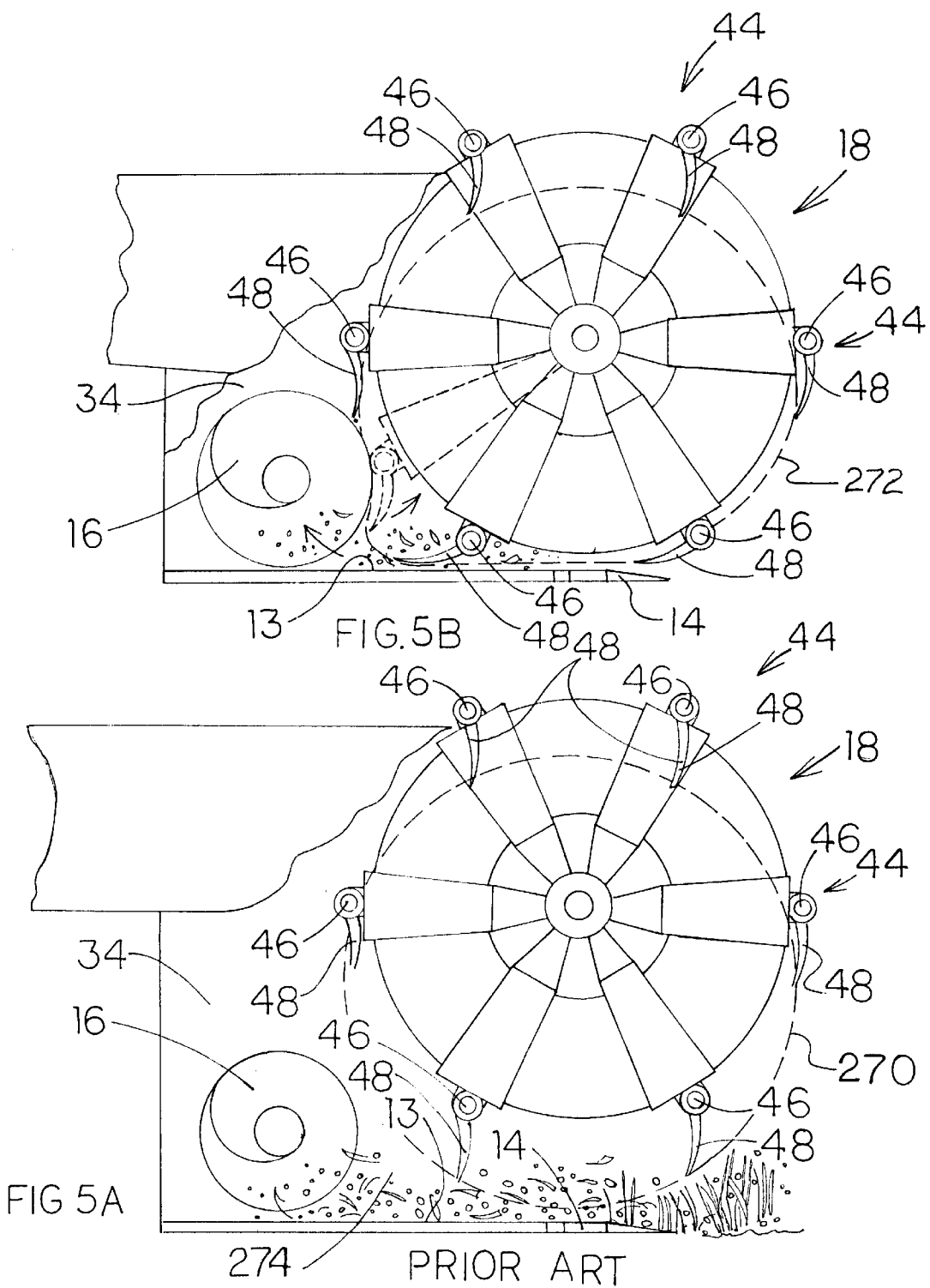

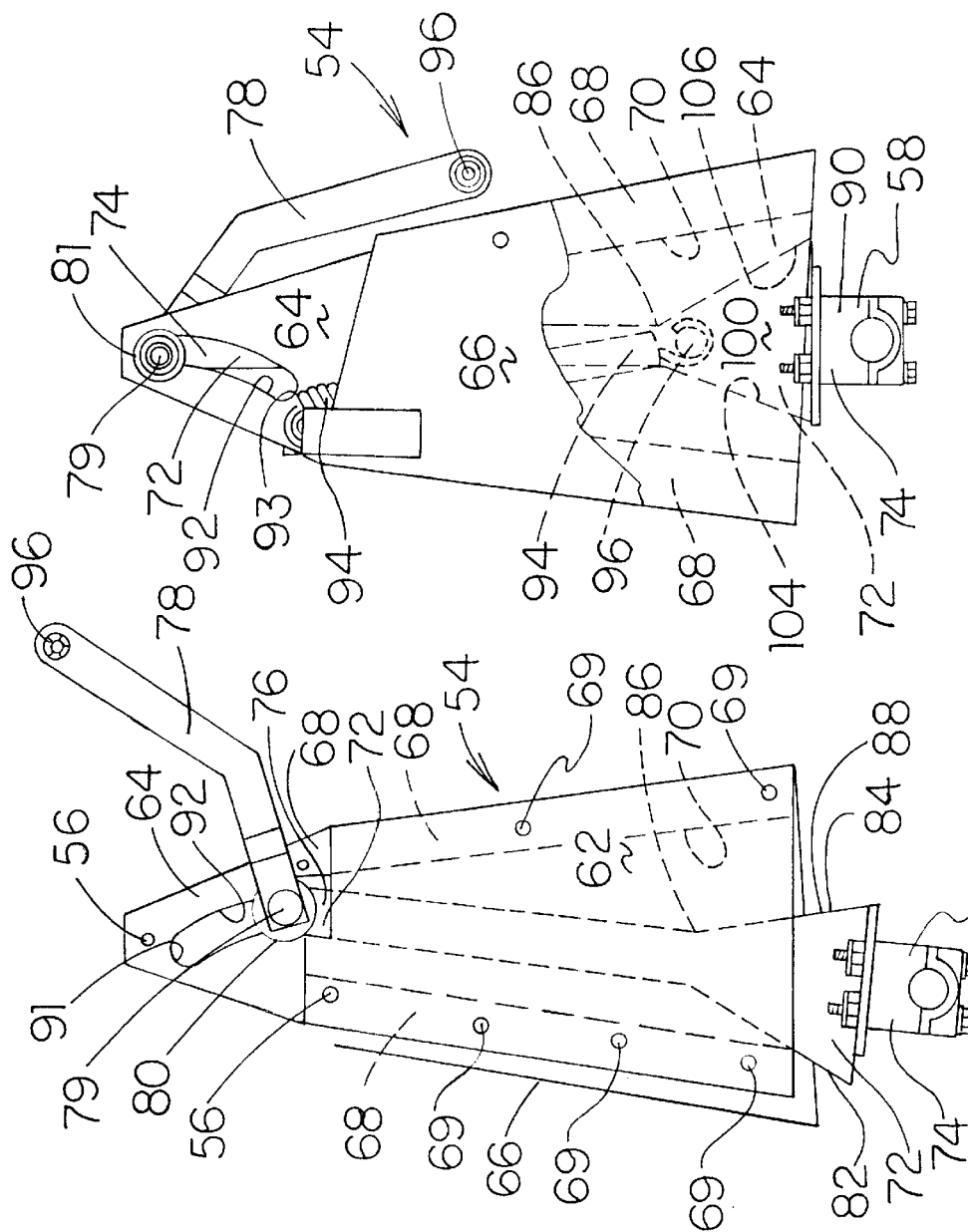

DRIVE SYSTEM FOR COMBINE REEL BATS

BACKGROUND OF THE INVENTION

The present invention relates to a new and improved drive for the bat reel assemblies of combines used to harvest crops such as canola, rye, oats, wheat, soybeans and other crops, and more particularly, to a new and improved drive system for combine reel bats which allows the bats to feed the crop into the combine continuously at a more consistent rate than heretofore in cooperation with the cutter to reduce the breakage of reel bat fingers and combine down time, increase the efficiency of the combine, and decrease crop loss.

Combines are commonly used by farmers all over the world to harvest their crops. Various varieties of grains, kernels and beans that range in height from a couple inches to several feet above ground, are cut by the header and fed into the combine. Combines which are designed to harvest these crops have a floating header pivotally connected to the combine in front of a feed auger. Mounted over the header are a plurality of elongated bats arranged in circumferentially spaced apart and parallel fashion to define a reel which rotates as the combine moves down the field. Each of the bats of the reel assembly have a plurality of spaced apart fingers or an elongated paddle ("fingers" herein) which rake through the crop and presents the crop to the cutter on the leading edge of the header and feeds the cut crop into the auger of the combine. Depending upon the crop size, the moisture of the crop and the cutting conditions, feeding the crop into the auger may present problems. While it is desired to have a constant flow of cut crop fed over the header bottom and into the auger, typically, bunches of cut crop collect on the header bottom and are fed into the auger in clumps causing a number of problems ranging from higher fuel consumption, inconsistent operation to breakage and shut down. It is therefore highly desirable to provide a new and improved drive system for the bat reel assembly of a combine header. It is also highly desirable to provide a new and improved drive system for the bat reel assembly of a combine header by which crops are properly presented for cutting and cut crops are more continuously and evenly fed into the auger.

All such combines either have a floating header or a rigid or fixed header. Both headers have at its leading edge a cutter blade. The floating header pivotally hangs from the header such that the header gravitationally lays on the ground and follows the contour of the ground. Because of the unevenness of the ground, the header may move up and down causing a number of problems ranging from feed inconsistencies to actual impingement upon the fingers of the rotating bats resulting in finger breakage and down time. It is therefore highly desirable to provide a new and improved drive system for the bat reel assembly of a combine header to cooperate with a floating header and reduce finger breakage. It is also highly desirable to provide a new and improved drive system for the bat reel assembly of a combine header to provide for improved feeding of cut crop into the auger with both floating headers and fixed headers and at the same time to reduce bat finger breakage and combine down time. It is also highly desirable to provide a new and improved drive system for the bat reel assembly of a combine header which allows the bats to accommodate a floating header in all header positions.

Farmers presently adjust the height of the bats from the header in its highest position such that the rake fingers of a bat will clear the header in all header positions. This means that when the header is in its lowest position, the rake fingers of the bat may be positioned away from the header 9 to 15 inches or so. Thus, the rake fingers do not adequately feed cut crop into the auger of the combine and cut crop is left on the field. Additionally, cut crop is bunched up on the header and fed into the auger in clumps discontinuously. In order to accomplish continuous, consistent and even feeding of crop into the auger, the rake fingers of the bats desirably are positioned away from the header approximately ½ to 4 inches. However, if the bats were adjusted so that the fingers of the bats were approximately ½ to 4 inches from the floating header, the header in normal operation would repeatedly engage the reel fingers and the reel fingers would be broken causing combine down time. It is therefore highly desirable to provide a new and improved drive system for the bat reel assembly of a combine header by which the reel fingers cooperate with the floating header to continuously feed cut crop into the auger at a more consistent rate. It is also highly desirable to provide a new and improved drive system for the bat reel assembly of a combine header which rotates the reel fingers as they approach the header to provide the desired feed of cut crop into the auger continuously and at a more consistent rate without finger breakage.

The shape of the headers in relation to the reel fingers of the bats also provides that typically the distance between the reel fingers of the bats and the header increase as the crop approaches the auger. In some instances, typically the distance between the reel fingers and the bat may increase from approximately 6 to 7 inches to approximately 12 to 15 inches away from the header as the crop is fed into the auger. Such does not provide for an even and consistent flow of cut crop into the auger. It is therefore highly desirable to provide a new and improved drive system for the bat reel assembly of a combine header whereby the reel fingers of the bats are spaced apart from the header essentially the same distance over the entire distance between the cutter bar to the auger. It is also highly desirable to provide a new and improved drive system for the reel fingers of each bat whereby the reel fingers begin to rotate ahead of the header into a collapsed condition and to rotate in the opposite direction to extend the fingers into their normal generally vertical position adjacent to the auger.

It is therefore highly desirable to provide a new and improved drive system for the bat assembly of a combine header to lift down crop clear of the ground by the reel fingers of the bat reel assembly and present the same to the cutter bar to efficiently feed the cut crop into the auger continuously and at a more consistent rate without finger breakage.

It is also highly desirable to provide a new and improved drive system for the bat reel assembly of a combine header which presents the cut crop lengthwise to the combine feed unit and holds the cut crop generally vertically in front of the feed auger and presents the cut crop lengthwise to the thrashing cylinder thereby to continuously feed the cut crop at a more consistent rate without finger breakage.

It is also highly desirable to provide a new and improved drive system for the bat reel assembly of a combine header which allows the combine to top wheat, oats and other such crops to have more high quality straw available, reduce combine load and reduce rotor loss.

It is also highly desirable to provide a new and improved drive system for the reel fingers of each bat which allows the reel fingers to move upon impact and biases the reel fingers into their generally vertical position adjacent to the auger and remote from the header and in their collapsed condition over the header.

Farmers utilizing combine headers which have a bat reel which rotates over a header such as above described, often experience cut crop winding about the bats. This crop entanglement reduces the efficiency of the bats to feed cut crop into the auger. It is also highly desirable to provide a new and improved drive system for the bat assembly of a combine at a position remote from the header to unwind cut crop from the reel fingers. It is therefore highly desirable to provide a new and improved drive system for the bat reel assembly of a combine header which rotates the reel fingers at a position remote from the header in the opposite direction to unwind cut crop from the rake fingers.

It is also highly desirable to provide a new and improved drive system for the bat reel assembly of a combine header which will cooperate with the combine header not only to reduce finger breakage, but to more continuously and evenly feed cut crop into the auger and generally reduce operating costs up to about twenty percent.

Finally, it is highly desirable to provide a new and improved drive system for the bat reel assembly of a combine which has all of the above features.

SUMMARY OF THE INVENTION

It is therefore an object of the invention to provide a new and improved drive system for the bat reel assembly of a combine header.

It is also an object of the invention to provide a new and improved drive system for the bat reel assembly of a combine header by which crops are properly presented for cutting and cut crops are more continuously and evenly fed into the auger.

It is also an object of the invention to provide a new and improved drive system for the bat reel assembly of a combine header to cooperate with a floating header and reduce bat finger breakage.

It is also an object of the invention to provide a new and improved drive system for the bat reel assembly of a combine header to provide for improved feeding of cut crop into the auger and at the same time to reduce bat finger breakage and combine down time.

It is also an object of the invention to provide a new and improved drive system for the bat reel assembly of a combine header which allows the bats to accommodate a floating header in all header positions.

It is also an object of the invention to provide a new and improved drive system for the bat reel assembly of a combine header by which the reel fingers cooperate with the floating header to continuously feed cut crop into the auger at a more consistent rate.

It is also an object of the invention to provide a new and improved drive system for the bat reel assembly of a combine header which rotates the reel fingers as they approach the header to provide the desired feed of cut crop into the auger continuously and at a more consistent rate without finger breakage.

It is also an object of the invention to provide a new and improved drive system for the bat reel assembly of a combine header whereby the reel fingers of the bats are spaced apart from the header essentially the same distance over the entire distance between the cutter bar and the auger.

It is also an object of the invention to provide a new and improved drive system for the reel fingers of each bat whereby the reel fingers begin to rotate ahead of the header into a collapsed condition and to rotate in the opposite direction to extend the fingers into their normal generally vertical position adjacent to the auger.

It is also an object of the invention to provide a new and improved drive system for the bat reel assembly of a combine header at a position remote from the header in the opposite direction to unwind cut crop from the rake fingers.

It is also an object of the invention to provide a new and improved drive system for the bat assembly of a combine header to lift down crop clear of the ground by the reel fingers of the bat reel assembly and present the same to the cutter bar to efficiently feed the cut crop into the auger continuously and at a more consistent rate without finger breakage.

It is also an object of the invention to provide a new and improved drive system for the bat reel assembly of a combine header which presents the cut crop lengthwise to the combine feed unit and holds the cut crop generally vertically in front of the feed auger and presents the cut crop lengthwise to the thrashing cylinder thereby to continuously feed the cut crop at a more consistent rate without finger breakage.

It is also an object of the invention to provide a new and improved drive system for the bat reel assembly of a combine header which allows the combine to top wheat, oats and other such crops to have more high quality straw available, reduce combine load and reduce rotor loss.

It is also an object of the invention to provide a new and improved drive system for the reel fingers of each bat which allows the reel fingers to move upon impact and biases the reel fingers into their generally vertical position adjacent to the auger and remote from the header and in their collapsed condition over the header.

It is also an object of the invention to provide a new and improved drive system for the bat reel assembly of a combine header which will cooperate with the combine header not only to reduce finger breakage, but to more continuously and evenly feed cut crop into the auger and generally reduce operating costs up to about twenty percent.

It is finally an object of the invention to provide a new and improved drive system for the bat assembly of a combine which has all of the above features.

In the broader aspects of the invention there is provided a new and improved drive system for the bat assembly of a combine by which the reel fingers of the bat are rotated from their generally vertical position into a collapsed position and then back into their generally vertical position as the bat fingers traverse from just prior to the header to just prior to the feed auger whereby the reel fingers of the bat can be adjusted to be spaced from the header in all of its positions to accomplish continuous feed of cut crop into the auger at a more constant rate and yet avoid breakage of reel fingers by the floating header impinging upon the reel fingers during use.

BRIEF DESCRIPTION OF THE DRAWINGS

The above-mentioned and other features and objects of the invention and the manner of attaining them will become more apparent and the invention itself will be better understood by reference to the following description of an embodiment of the invention take in conjunction with the accompanying drawings wherein:

FIG. 4 is a fragmentary close-up view like FIG. 3 showing the bat reel assembly of the invention in its lowest position;

FIG. 5a is a fragmentary, diagrammatic side view showing the positions of the bat reel assembly and the bats as they rotate above the header and in front of the auger in a conventional combine and the finger extension in dashed lines;

FIG. 5b is an illustration like FIG. 5a showing the bat rotation of the new and improved drive system of the invention as the bats approach the header and pass by the auger of the combine and the finger extension in dashed lines;

FIG. 9 is a plan view of the new and improved bat reel drive of the invention showing the inward mechanism in dashed lines;

FIG. 10 is a plan view of the new and improved bat reel drive of the invention taken from a diametrically opposed direction of that of FIG. 9 showing the inward mechanism in dashed lines;

FIG. 17 is a diagrammatic view of the new and improved bat reel drive system of the invention shown in FIG. 16 showing the individual chains and sprockets for each pair of bat reel drive of the system showing some of the bat fingers in their generally vertical position and others of the bat fingers in their folded position or various positions there between;

FIG. 18 is a diagrammatic view of a second modified version of the new and improved bat reel drive system of the invention which utilizes a single central sprocket and a single chain for all six of the bat drives of the system showing some of the bat fingers in their generally vertical position and others of the bat fingers in their folded position or various positions there between;

FIG. 19 is a diagrammatic view of a third modified version of the new and improved bat reel drive system of the invention in which a central sprocket and a chain is used for each of the bat drives of the new and improved bat drive system of the invention showing some of the bat fingers in their generally vertical position and others of the bat fingers in their folded position or various positions there between; and FIG. 20 is a diagrammatic view of a fourth modified version of the new improved bat reel drive system of the invention in which each of the bats is hydraulically or pneumatically driven showing some of the bat fingers in their generally vertical position and others of the bat fingers in their folded position or various positions there between.

DESCRIPTION OF A SPECIFIC EMBODIMENT

Figure 1:
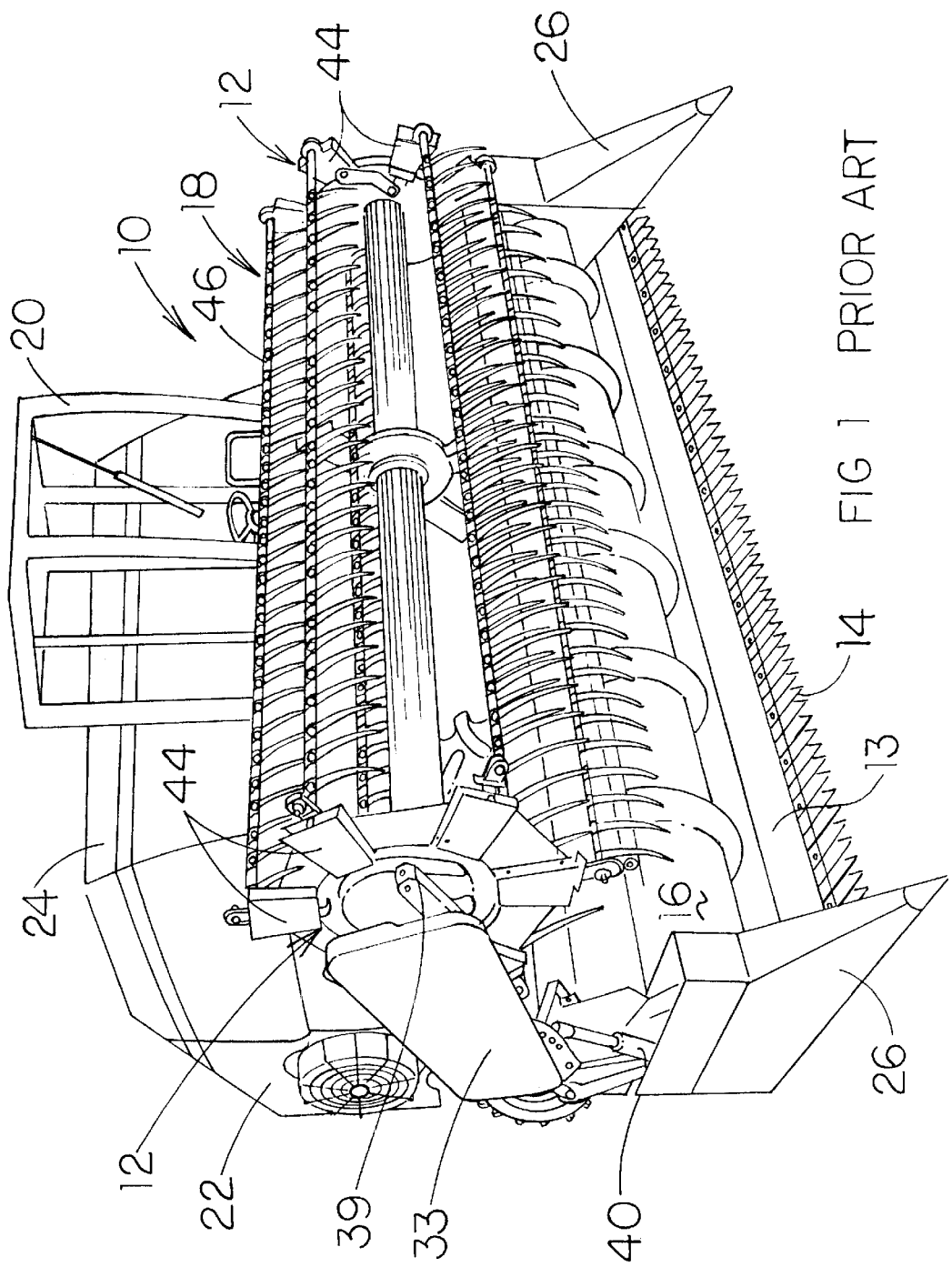
FIG. 1 is a perspective view of a conventional combine showing the cutter bar, the floating header, the feed auger and rotating bat reel assembly.
Figure 2:
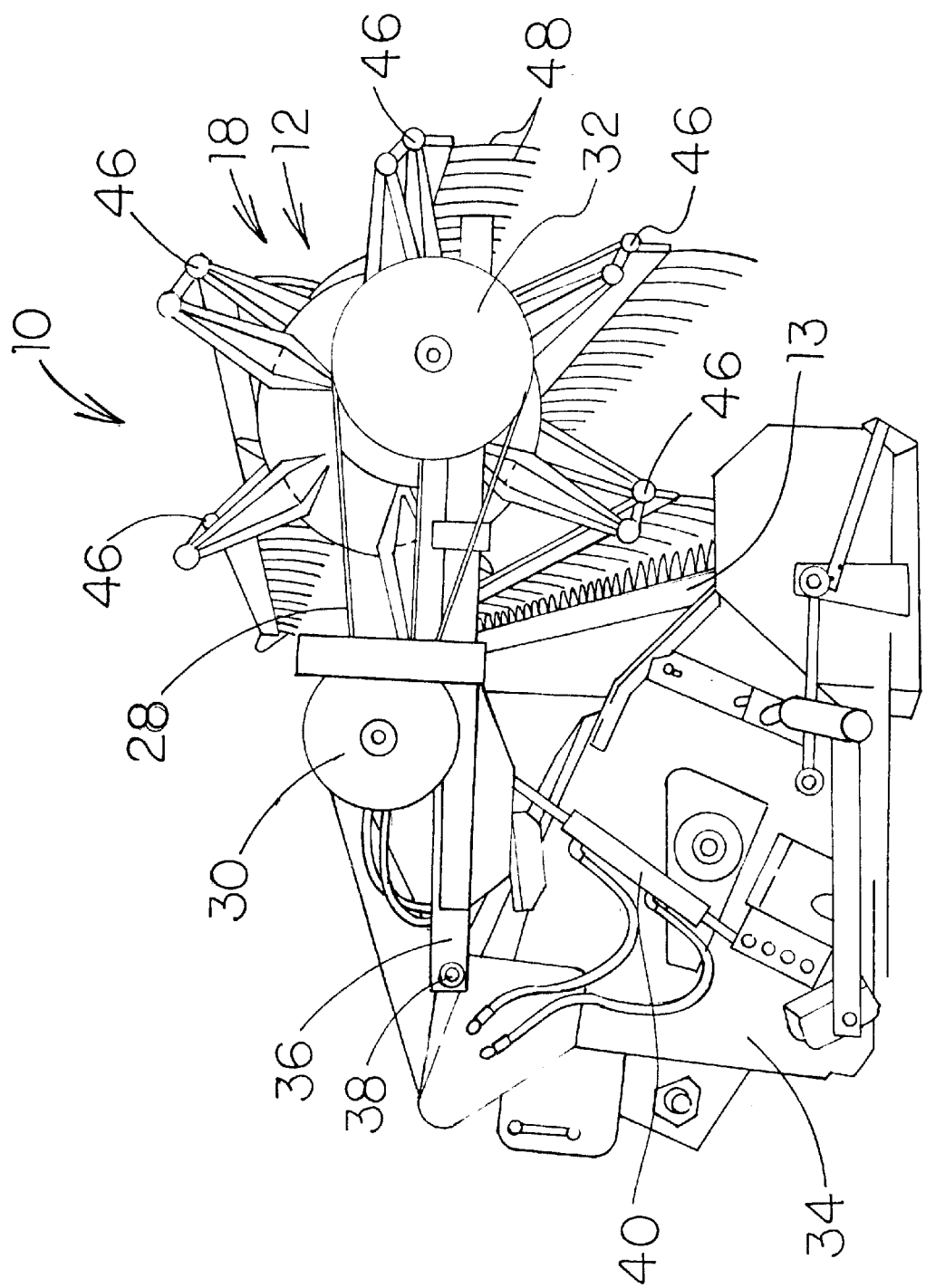
FIG. 2 is a perspective end view of the combine illustrated in FIG. 1 with the rotating bat reel assembly in its elevated position with the cab, engine, grain bin, chain cover and dividers removed for better viewing.
Figure 3:
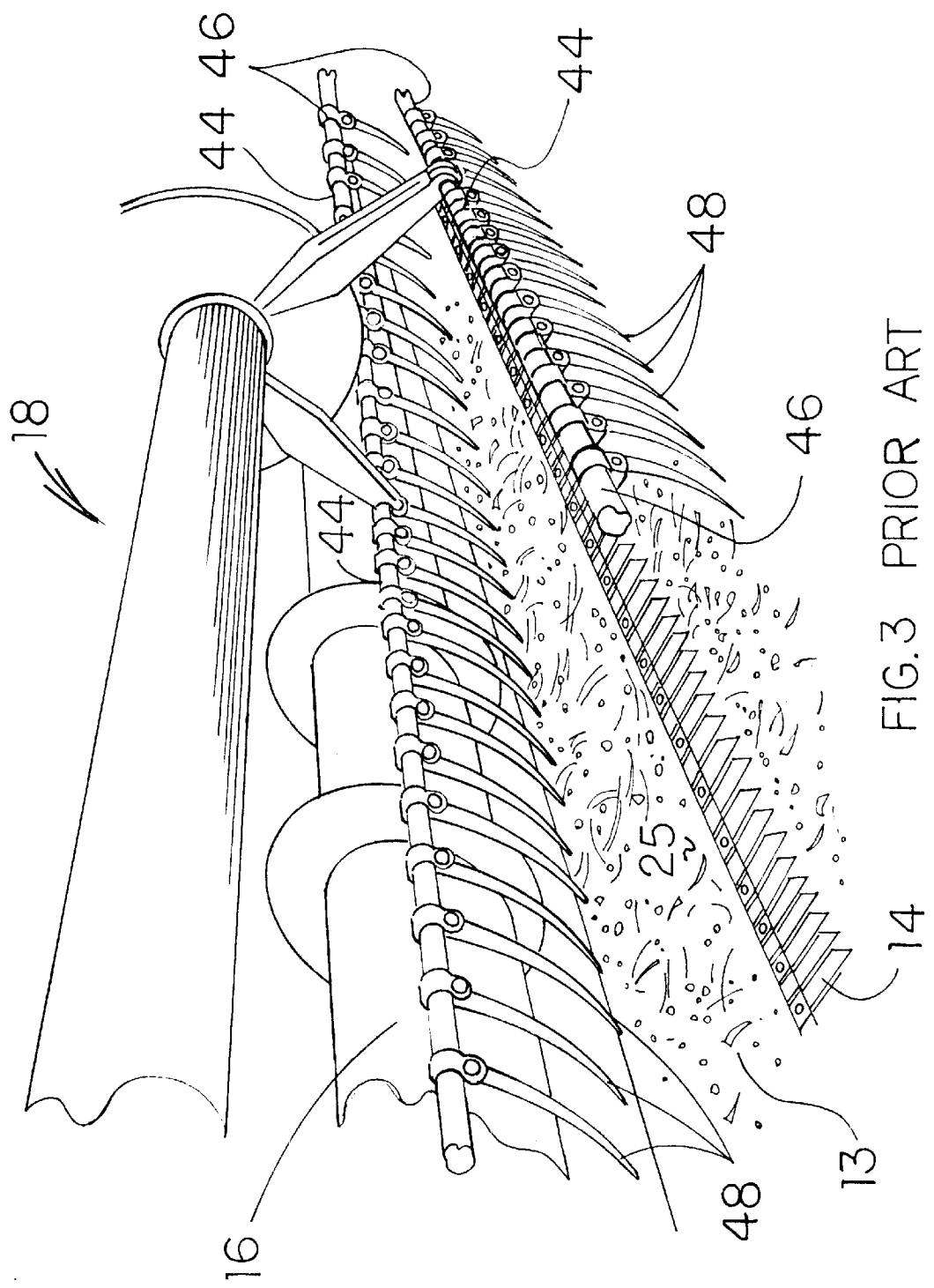
FIG. 3 is a fragmentary close-up view showing a conventional bat reel assembly of the combine in its lowest position.

Referring to FIGS. 1–3, there is shown a conventional combine 10. Combine 10 has a header 13, a cutter bar 14, an auger 16, a bat drive 12 and a reel assembly 18. To the rear of the reel assembly 18 is a cab 20, and behind the cab 20 is an engine 22 and a grain bin 24 for the harvested crop 25. Cutter bar 14 is bounded at each end by dividers 26.

Figure 5C:
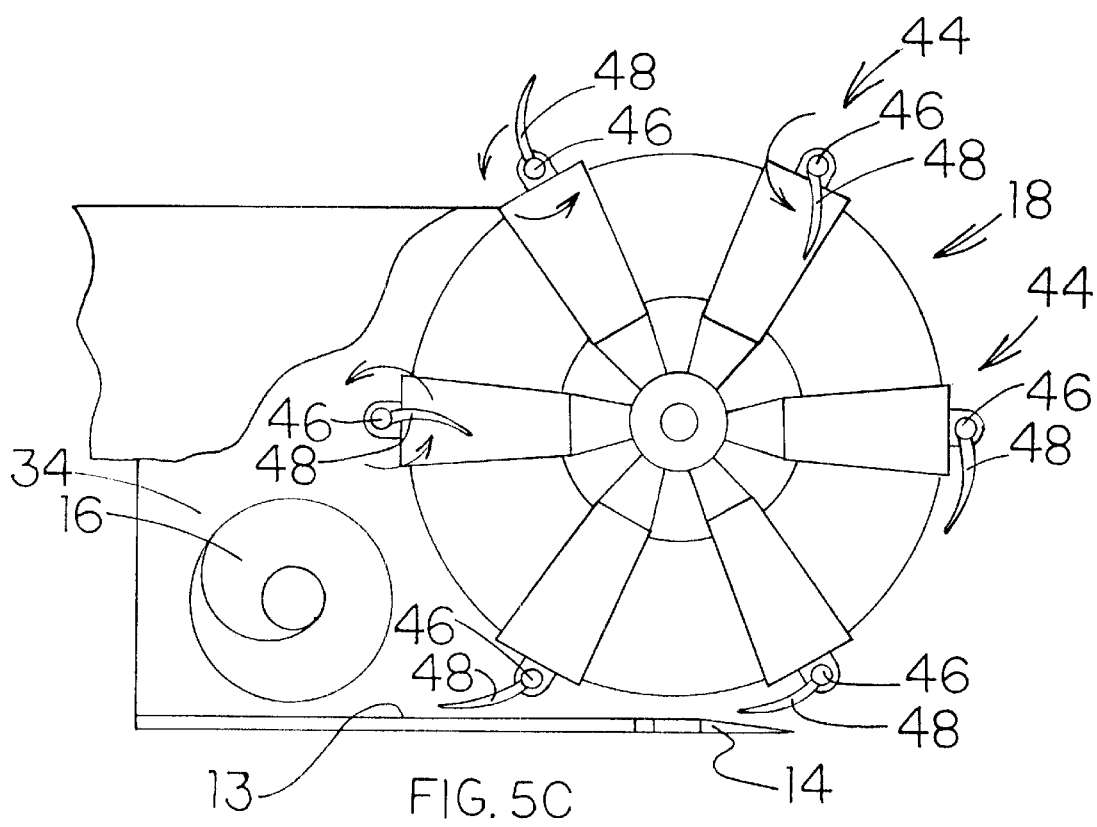
FIG. 5c is an illustration like 5a showing not only the bat rotation of the new and improved drive system of the invention as shown in FIG. 5b, but also the reverse rotation of the bat fingers remote from the header to unwind the stalks of any cut crop which may have wound around the bats in operation of the combine.

Referring to FIG. 2, there is shown the combine header 13, the combine frame 34, the pivot bar 36 pivotally secured to frame 34. Bar 36 has opposite ends 38, 39. End 39 of pivot bar 36 is pivotally secured to the bat reel assembly 18. The opposite end 38 of pivot bar 36 is secured to frame 34. A power cylinder 40 is shown interconnected between the frame 34 and the pivot bar 36 whereby power cylinder 40 can be extended to raise the bat reel assembly 18 into its upper position shown in FIG. 2 and retracted to lower the bat reel assembly into its operating position as shown in FIGS. 3 and 5a. The bat reel assembly 18 is driven by a chain 28 between motor sprocket 30 and a bat reel sprocket 32. Chain 28 is shown in FIG. 1 covered by chain cover 33.

The above description describes almost every grain header manufactured in the last 40 years. Each has a frame 34, a bat drive system 12, a header 13, a cutter 14, an auger 16, a bat reel assembly 18, a cab 20, an engine 22, dividers 26 and bat assembly drive sprockets 30, 32 and chain 28, and all of the other structure above-described. Each of the various brands of headers may differ in various minor respects, but in no respect critical to the invention described herein. The bat reel assembly 18, the augers 16, the headers 13 and the cutter bars 14 may be provided in these combines in different lengths. However, the bat drive systems 50, 150, 200, 220 and 250 of the invention maybe adapted in each case to replace the conventional bat drive system 12 of each of these headers in manners fully known to those skilled in the art of harvesting equipment.

Each of the bat reel assemblies 18 conventionally have a plurality of circumferentially spaced apart bats 44 consisting of a bat rod 46, and in the embodiment shown in the drawings, a plurality of spaced apart bat fingers 48 secured to the bat rod 46. In combines designed to harvest wheat and some other small grains, these bats 44 will have instead of the fingers 48, a bat trowel or paddle in the form of an elongated bat plate secured to the bat rods 46. These bat plates are not shown, however, as the bat reel assembly 18 rotates about its central axis each of the bat rods 46 rotate in the same manner as described herein to maintain the bat fingers or the bat plates 48 generally vertically or perpendicular to the ground. In this manner, the bats 44 of the reel assembly 18 always are correctly positioned to move crop into the cutter bar 14 and across the header 13 into auger assembly 16. In general, the bat drive system functions to rotate the rods 46 to maintain the position of the bat fingers or bat plates 48 in the desired generally vertical position as the bat reel assembly 18 rotates.

The new and improved bat drive systems 50, 150, 200, 220 and 250 of the invention will be described. The new and improved bat drive systems 50, 150, 200, 220 and 250 are mounted between the bat sprocket 32 and the bat assembly 18 as shown in FIGS. 1 and 2 replacing the conventional bat drive system 12 of the combine. The new and improved bat drive systems 50, 150, 200, 220 and 250 can be assembled on every combine made in the last 40 years by removing old bat drive system 12 and replacing the same with the new bat drive system.

Referring to FIGS. 6–15, the new and improved bat drive assembly 50 is shown to include a plate 52 to which bat drives 54 is secured by bolts 56. Bat drives 54 are paired in diametrically opposite bat drive pairs. Traditionally, three or four such pairs are positioned circumferentially spaced apart about plate 52. The bat drives 54 extend diametrically outwardly of the plate 52. At the distal end of each bat drive 54 is a bat clamp 58 which is pivotally connected to one end 59 of a bat operating lever 60. The other end 61 of lever 60 is pivotally connected to bat rod 46. By bat operating lever 60, each bat rod 46 is rotated into and out of a folded position by the extension of the cam lever 72 of the bat drive 54 as will be described in more detail hereinafter.

Figure 11:
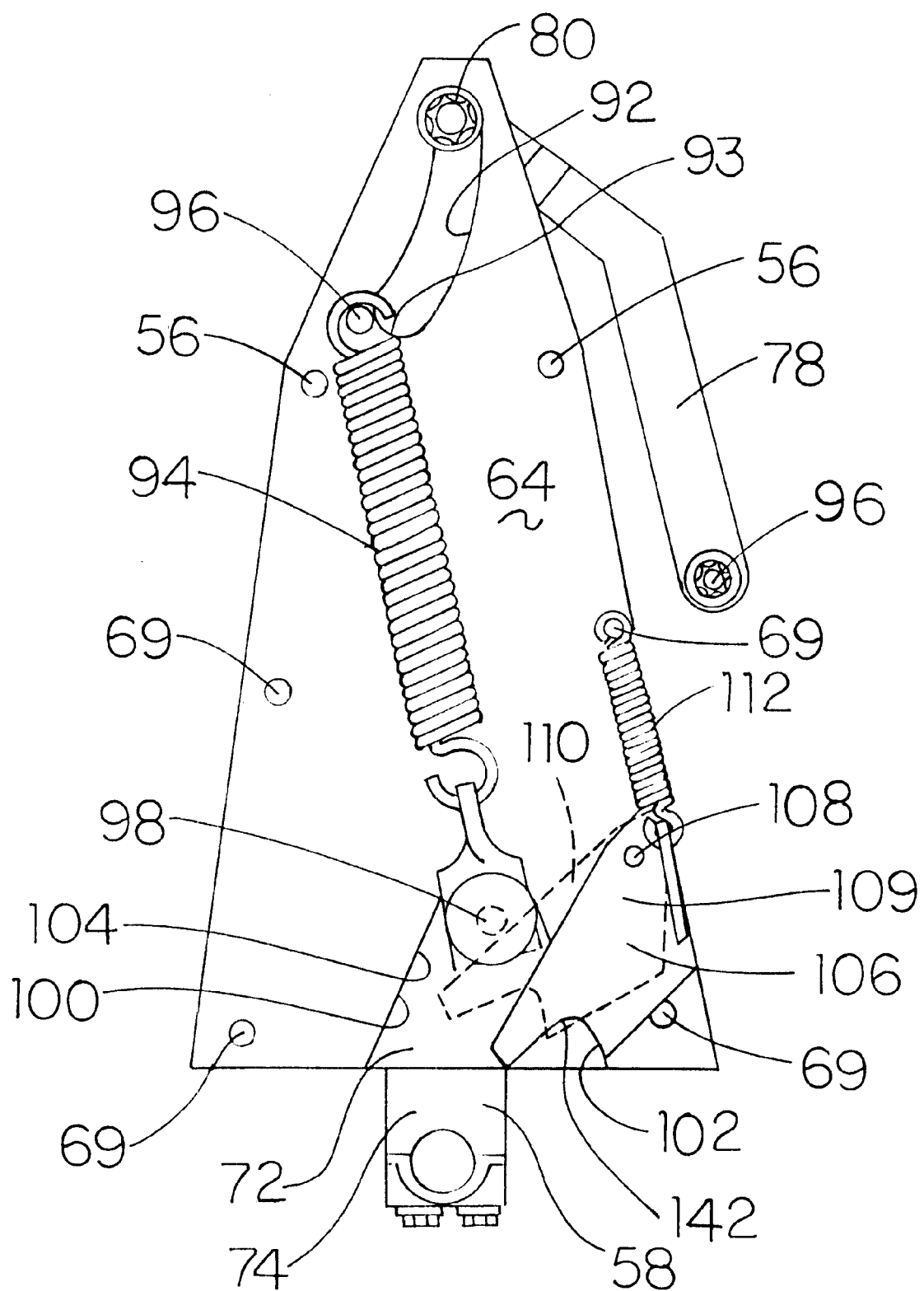
FIG. 11 is a plan view of the new and improved bat reel drive of the invention shown in FIGS. 9 and 10 with the cover removed showing the inside structure.
Figure 12:
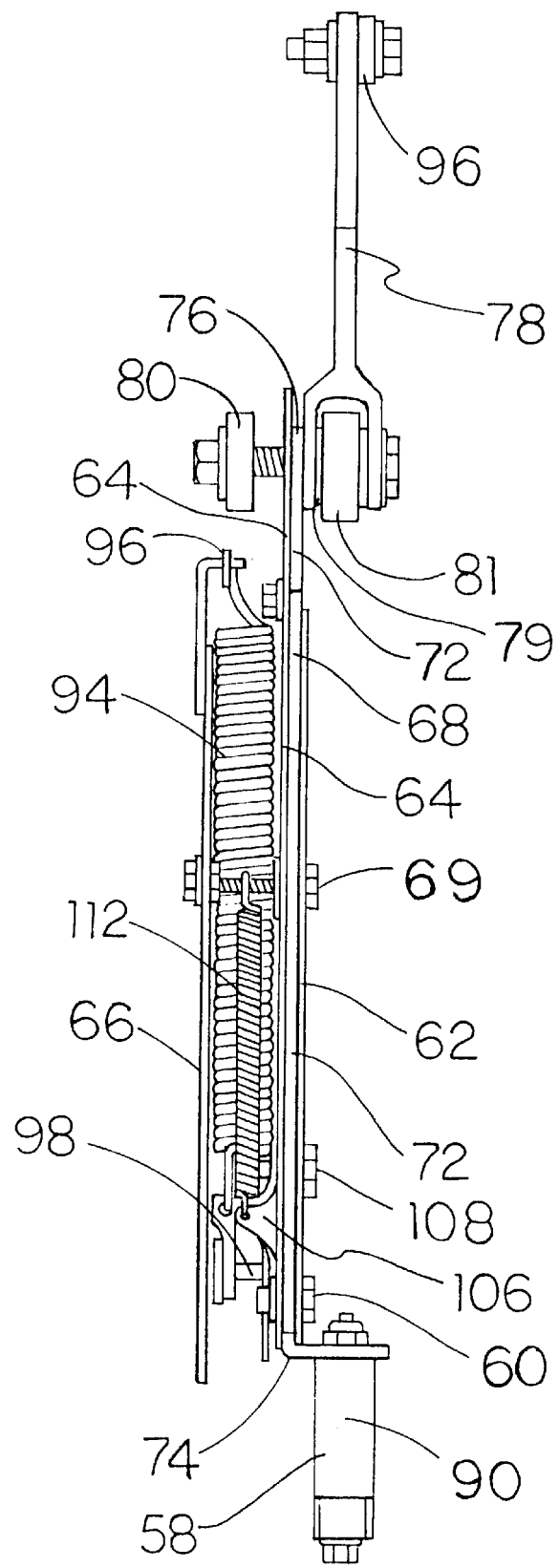
FIG. 12 is an end view of the new and improved bat reel drive of the invention.
Figure 13:
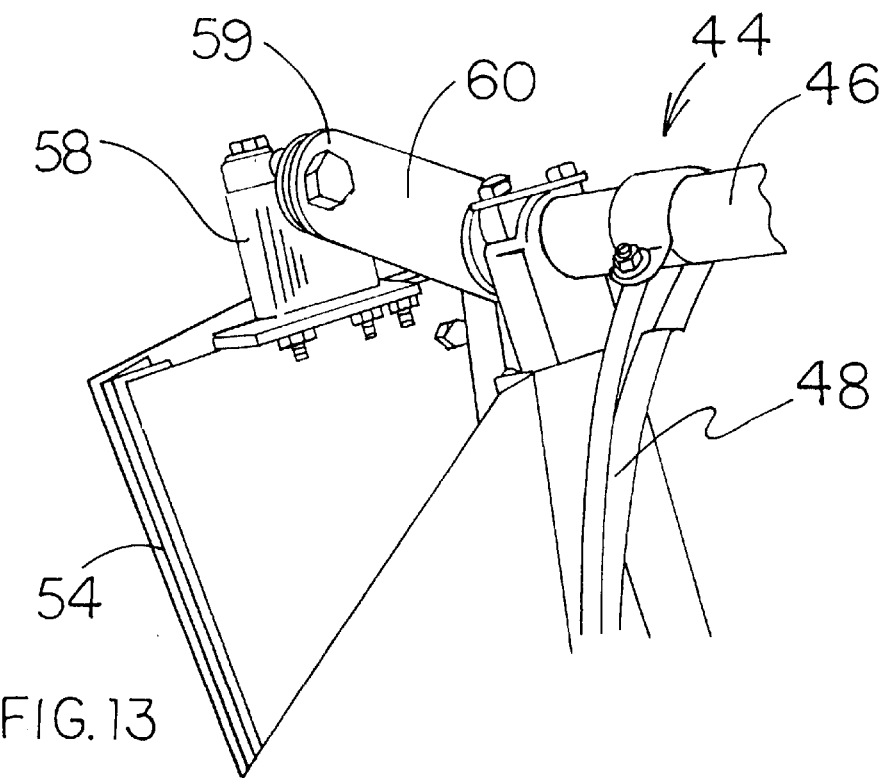
FIG. 13 is a fragmentary perspective view of the connection between the new and improved bat reel drive of the invention and its connected bat.
Figure 14:
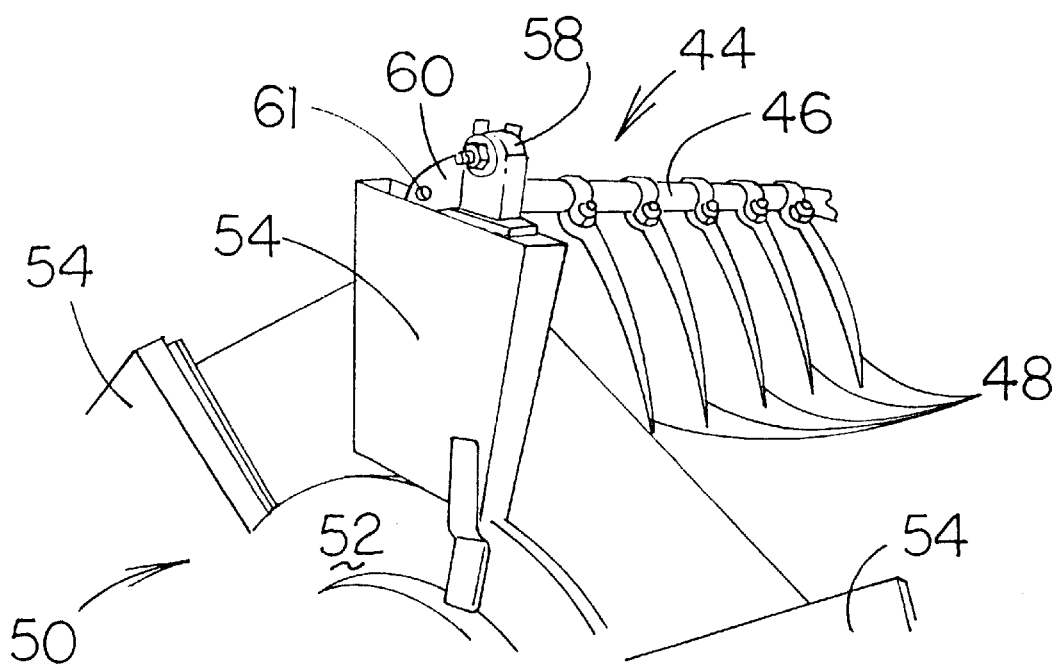
FIG. 14 is a fragmentary perspective view of the connection between the new and improved bat reel drive of the invention and its connected bat from another direction.
Figure 15:
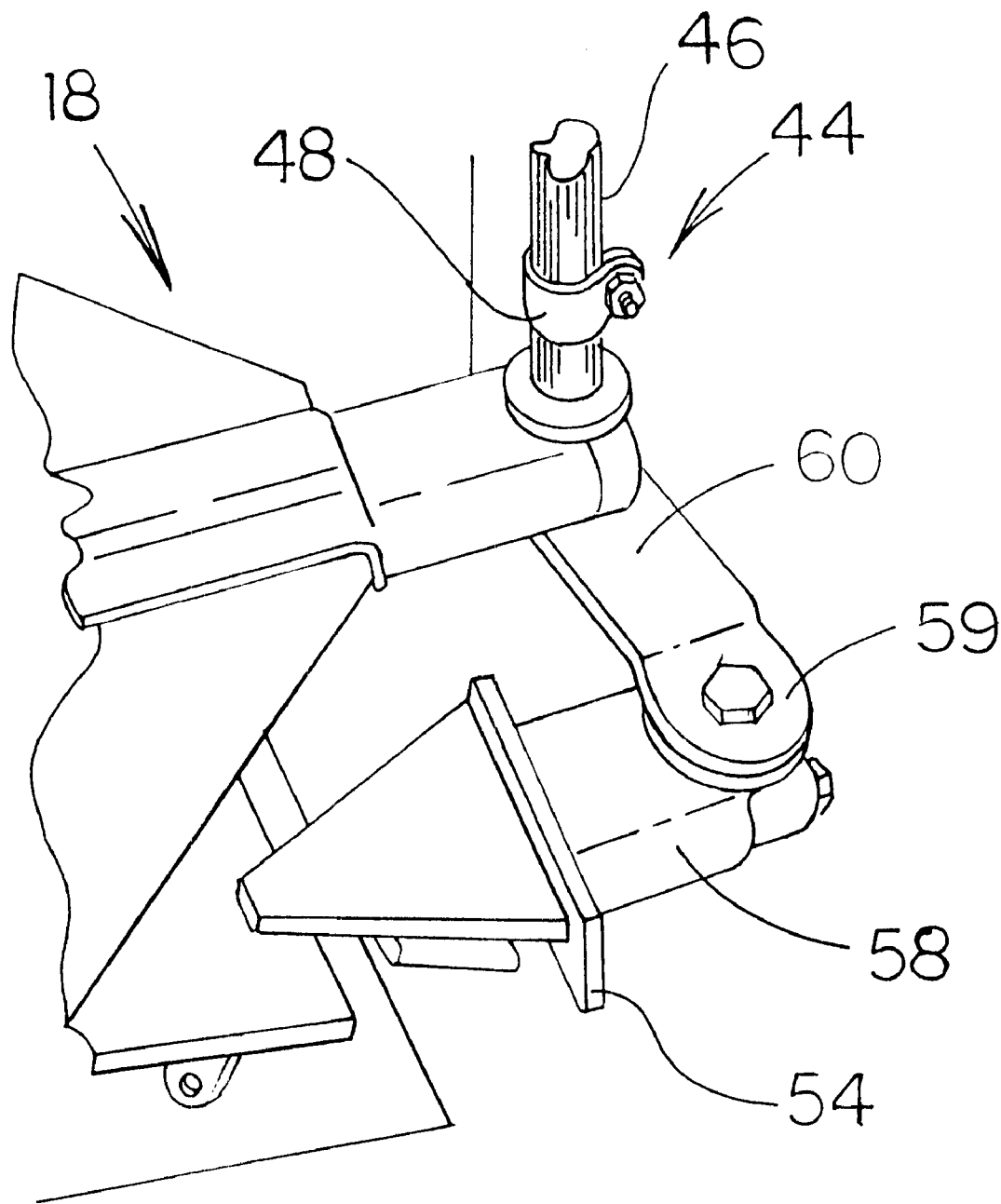
FIG. 15 is a fragmentary perspective view of the new and improved bat reel drive of the invention and its connected bat from yet another direction.

Bat drives 54 are identical, and thus, a description of one will suffice for all. Each of the bat drives 54 include two spaced apart plates 62 and 64 and a cover 66 as shown in FIGS. 9, 10 and 11. Plates 62 and 64 are spaced apart by spacers 68 to define a passageway 70 extending longitudinally of the bat drive 54. Plates 62 and 64 and spacers 68 are secured together by spaced bolts 69. Positioned within the passageway 70 is a bat cam lever 72. Bat cam lever 72 has opposite ends 74, 76. Adjacent end 74 of the bat cam lever 72 is bat clamp 58. Adjacent end 76, bat cam lever 72 is pivotally connected to cam lever 78 by a pin 79. Pivotally mounted on the opposite sides of the bat cam lever 72 on pin 79 are a pair of cam rollers 80, 81. Bat cam lever 72 adjacent end 74 is wedge shaped having opposite cam edges 82, 84. Cam edges 82, 84 converge toward end 76 and extend between lever end 74 and cam edge end 86. Edges 82 and 84 are generally planar. Between end 76 and end 86, opposite edges 82 and 84 are generally parallel to each other.

Bat cam lever 72 is movable between plates 62 and 64 and spacers 68 longitudinally of bat driver 54 to move clamp 58 between an extended position 88, shown in FIG. 9, and a retracted position 90, shown in FIG. 10. A slot 92 is positioned in plate 64. Bat cam lever pin 79 is positioned in slot 92 with cam rollers 80, 81 on opposite sides of plate 64 and with bat cam lever 78 on the same side of plate 64 as roller 81. Pin 79 is allowed to move within slot 92. Slot 92 has opposite ends 91 and 93. End 91 with pin 79 defines retracted position 90 of bat cam lever 72 and end 93 with pin 79 similarly defines extended position 88 of bat cam lever 72 as pin 79 is at end 91 of slot 92 when cam lever 72 is in its retracted position 90 and is at the other end 93 of slot 92 when cam lever 72 is in its extended position 88. Pin 79 is positioned in slot 92 and spaced apart from the opposite elongated sides thereof by bat cam lever 78 as will be mentioned hereinafter. This allows for bat cam lever 72 to move longitudinally of slot 92 and of bat driver 54 without any restriction by pin 79 contacting plate 62 while moving in slot 92.

On the opposite side of plate 64 is mounted a spring 94 which resiliently urges bat cam lever 72 into its collapsed position 90. Spring 94 is extended between pin 96 which extends between plate 64 and cover 66 and pin 98 which extends outwardly of bat cam lever 72. Plate 64 is cut away at 100 to allow pin 98 to move between extended position 88 and collapsed position 90 of bat cam lever 72. Edges 102, 104 of cut away 100 are generally planar and sloped toward each other away from clamp 58 to guide pin 98 and bat cam lever 72 into collapsed position 90.

Also positioned between plate 64 and cover 66 is lock lever 106. Lock lever 106 is pivotally connected to plate 64 by pivot pin 108 which extends between plate 64 and cover 66. Lock lever 106 moves between a locked position 109 and an unlocked position 110. Spring 112 is provided to bias lock lever 106 into its locked position 109 as shown in FIG. 11. Spring 112 is connected between lock lever 106 and adjacent bolt 69. Bolts 69 secure plates 62, 64, spacers 68 and cover 66 together.

Figure 6:
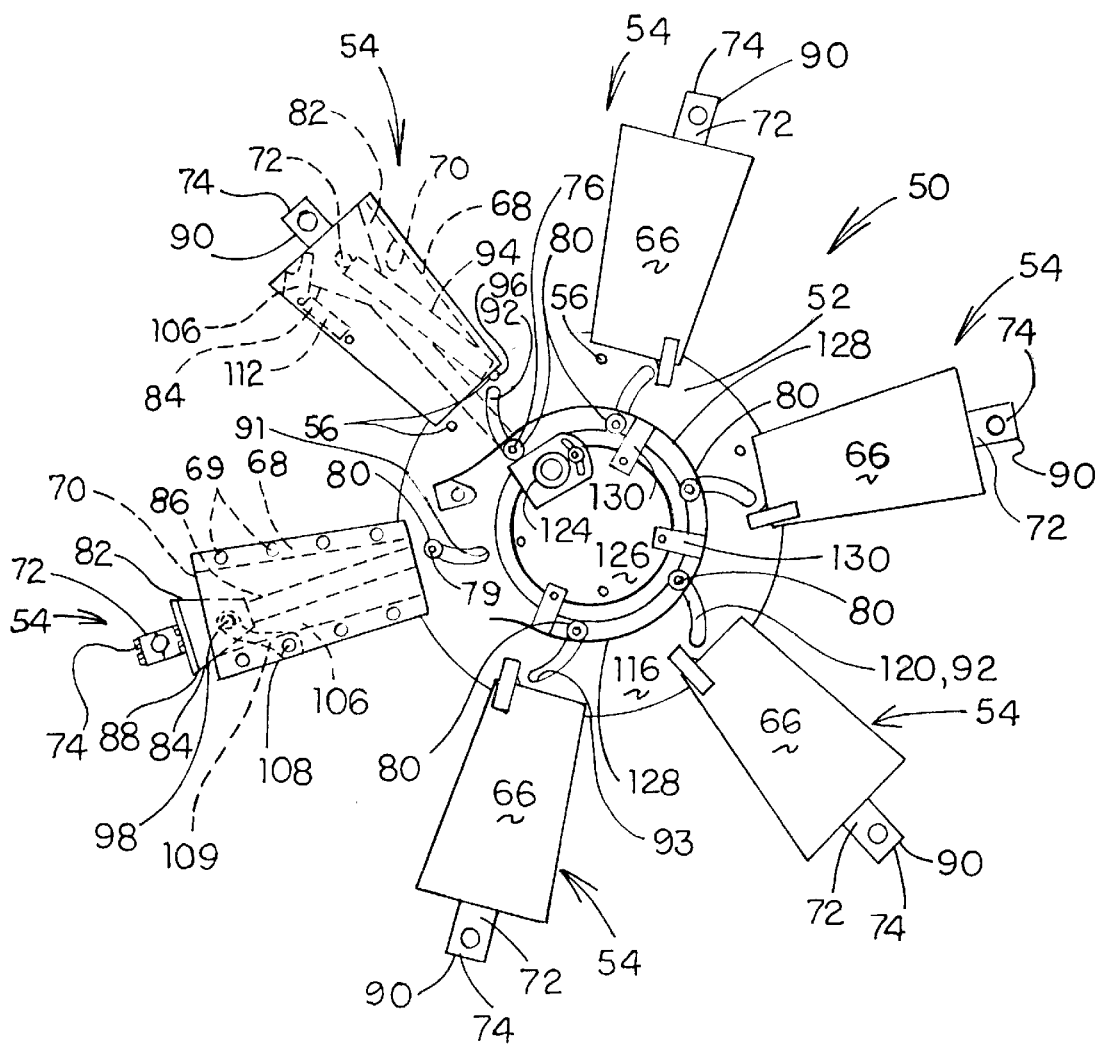
FIG. 6 is a plan view of the new and improved bat drive system of the invention showing the inner mechanism of two of the bat drives in dashed lines, one of the bat drives being in its extended position and the other of the bat drives being in its retracted position.
Figure 7:
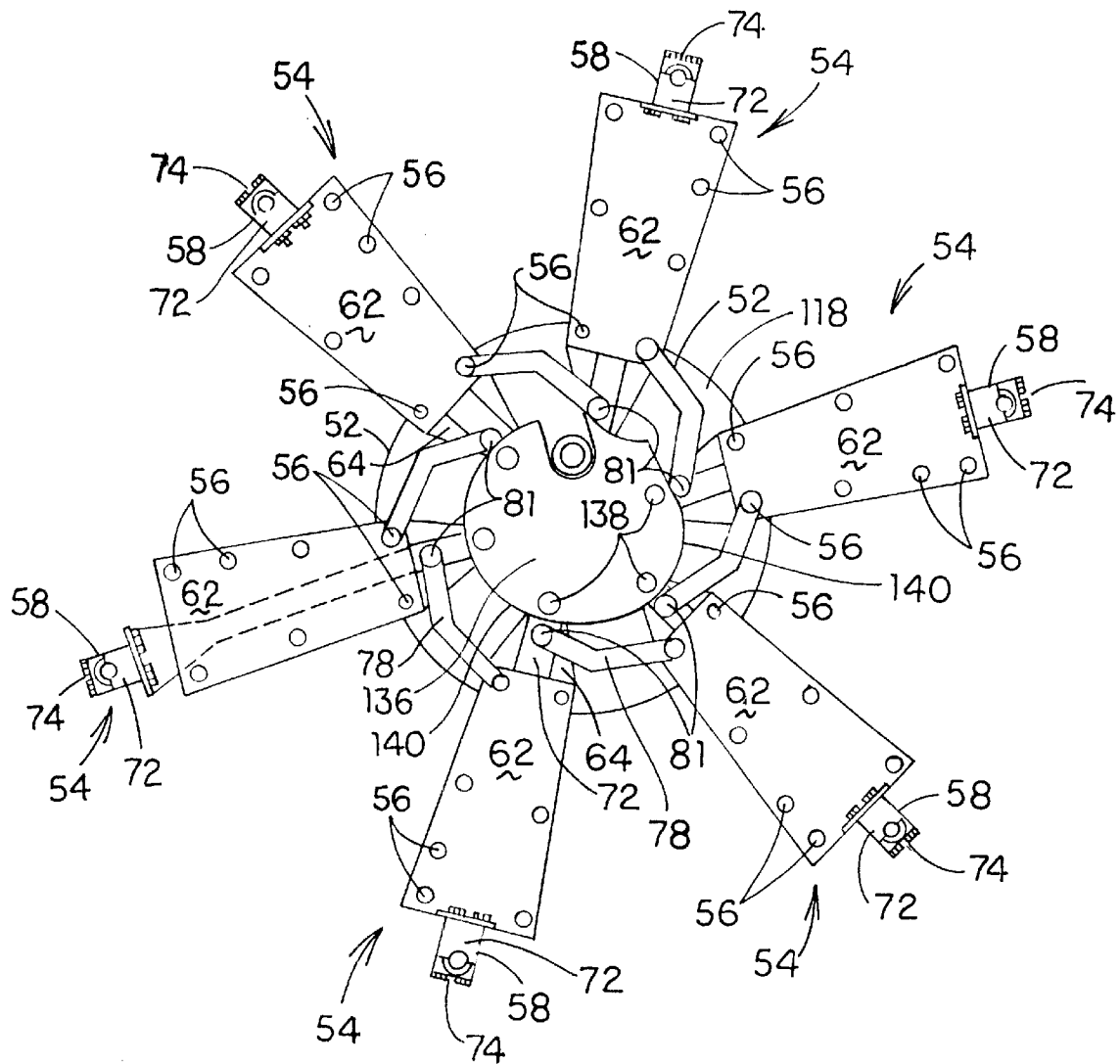
FIG. 7 is a plan view of the new and improved bat reel drive system of the invention shown in FIG. 6 from the opposite direction thereof showing one of the bat drives in its extended position.
Figure 8:
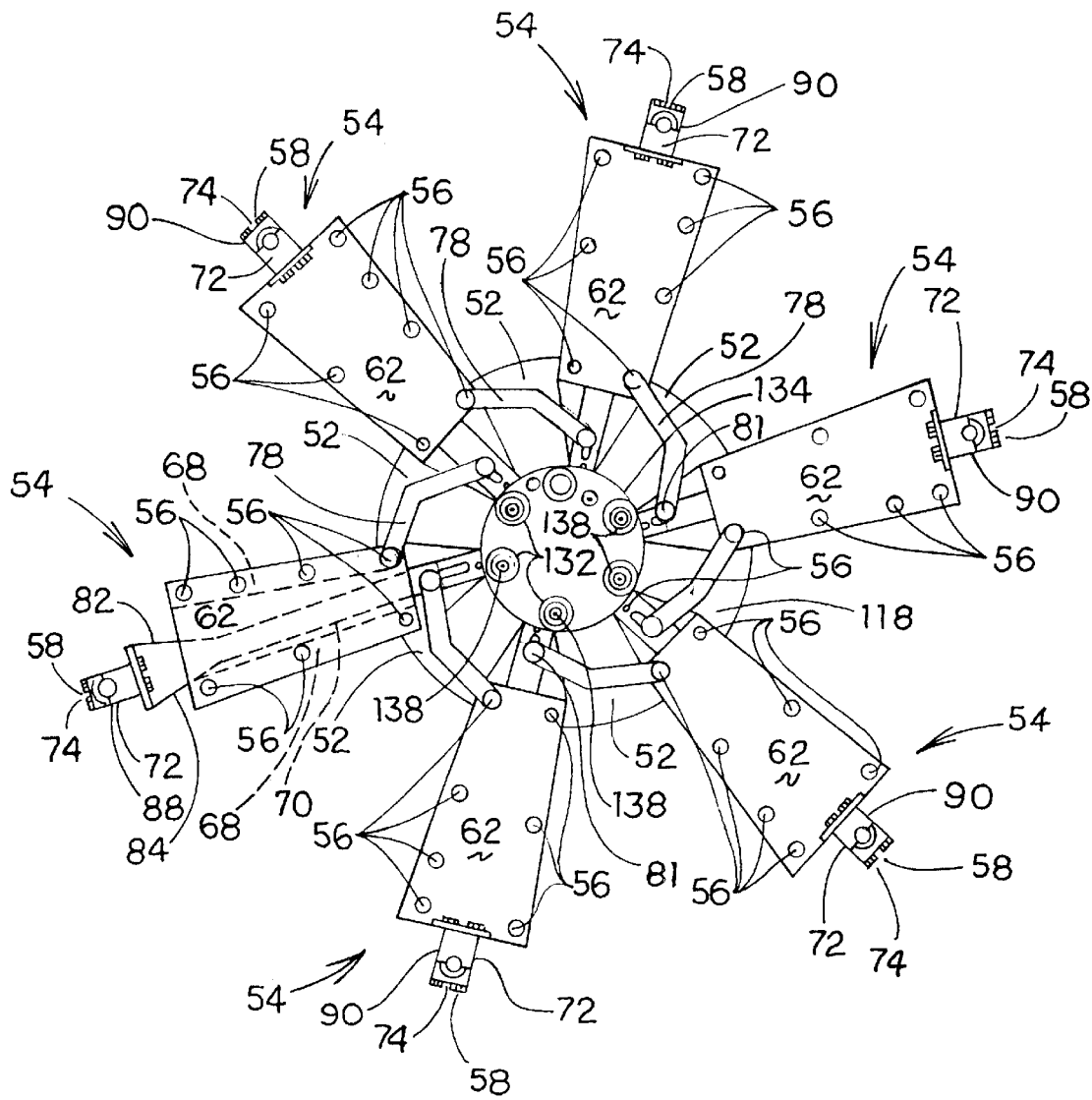
FIG. 8 is a plan view of the new and improved bat reel drive system of the invention shown in FIG. 6 from the opposite direction thereof with the cover removed showing one of the bat drives in its extended position and the interior mechanism in dashed lines.

Referring now to FIGS. 6–8, there is shown the new and improved bat drive system 50 of the invention to comprise a plate 52 to which a plurality of bat drives 54 are secured so as to extend radially outwardly therefrom. Bat drives 54 are secured in diametrically opposite pairs. FIGS. 6–8 show the new and improved bat drive system 50 of the invention to include three diametrically opposite pairs, or a total of six bat drives 54. However, more or less pair may be used if desired. Each of the bat drives 54 are secured to plate 52 by bolts 56. Adjacent each of the bat drives 54, plate 52 has a slot 120 therein which is sized and positioned so as to coincide with slot 92 when plate 64 of a drive 54 is secured to plate 52 by bolts 56. Pin 79 is positioned within slots 92, 120 and cam rollers 80, 81 are positioned on opposite sides 116, 118 of plate 52 shown in FIGS. 6 and 8. Inward of the combine drive flange 124 there is a cam plate 126 secured to drive flange 124 and a cam 128 secured to each plate 126 by brackets 130. Plate 52 and bats 54 attached thereto are mounted to plate 126 for rotation by cam rollers 132 which are positioned within a drum 134 which extends inwardly of plate 126. See FIG. 8. Thus, plate 52 and the bats drivers 54 attached thereto rotate about drum 134 relative to flange 124, plate 126, drum 134 and cam 128. Each of the cam rollers 81 of the individual bats 54 ride upon cam 128 as shown in FIG. 6. Both the bat cam lever 78 and cam roller 81 is positioned on the side 118 of plate 52 opposite cam 128. Cam lever 78 is secured to adjacent bat lever 54 about pin 56. Cam lever 78 between pin 56 and pin 79 has a length equal to the radius of slots 92, 120. Thus, cam lever 78 pivots about pin 96 of adjacent bat driver 54 as bat cam lever 72 is moved between its extended 88 and retracted 90 positions so as to keep pin 79 spaced between the opposite side surfaces of slots 92 and 120 and free of any binding within slots 92, 120.

A cover 136 is secured to drum 134 by bolts 138 positioned coaxially of cam rollers 132 to enclose drum 134 and to keep cam rollers 132 free of foreign substances. Cover 136 has at its peripheral edge a cam 140 which cam rollers 80 engage when cam rollers 81 are not engaged with cam 128. As will be explained hereinafter, cam 128 maintains each of the bat drives in its retracted position 90 and cam 140 controls the rate at which each of the bat drivers 54 move against spring 94 into its extended position 88. See FIGS. 7 and 11.

Figure 16:
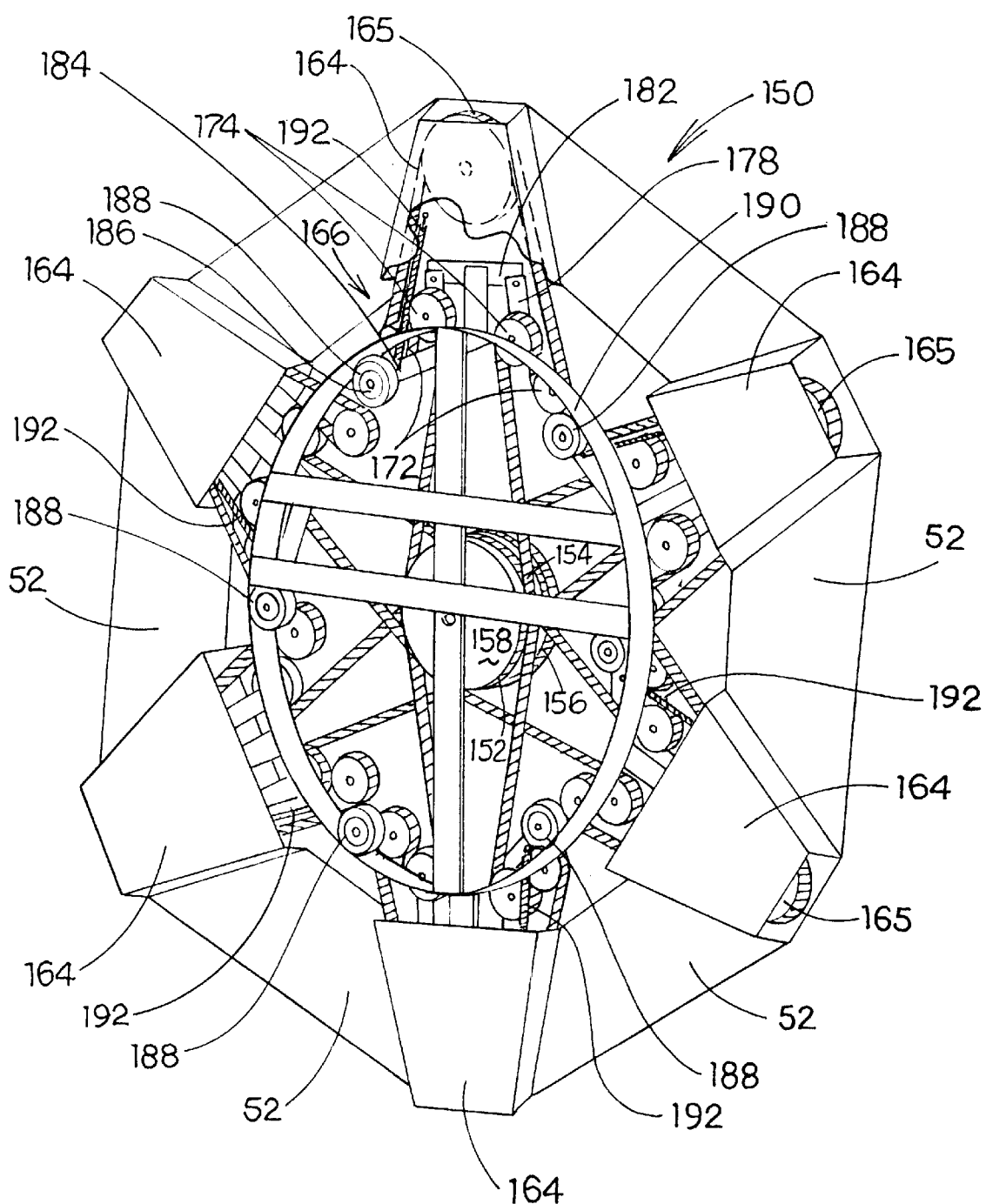
FIG. 16 is a perspective view of a modified version of the new and improved bat reel drive system of the invention.
Figure 17:
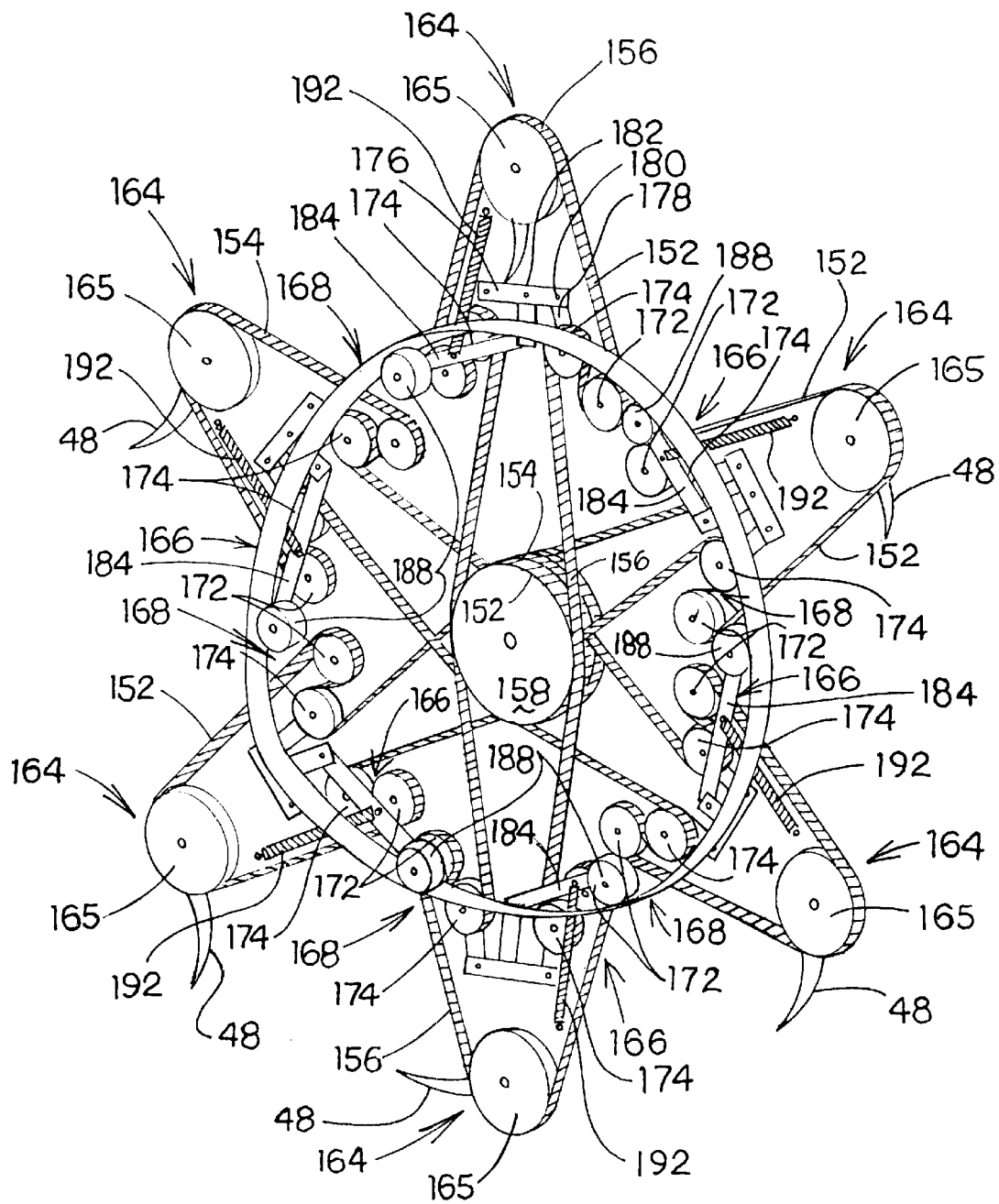

Referring to FIGS. 16 and 17, a modified version 150 of the bat drive system of the invention is shown. Like reference numerals will be used to denote like parts. Bat drive system 150 is shown to be driven by a plurality of chains 152, 154, 156 instead of the two cams 128, 140. A central sprocket 158 is secured to drive flange 124 for each chain 152, 154, 156. Each of the diametrically opposite bat drives 164 are driven by one of the chains 152, 154, 156 engaging one of the central sprockets 158.

Bat drives 164 are identical, and thus, a description of one will suffice for all. Bat drive 164 comprises an end sprocket 165 and two pair 166, 168 of sprockets linked together for common movement. Each sprocket pair 166, 168 has a movable sprocket 170 and a stationary sprocket 172. Stationary sprocket 172 like end sprockets are each pivotally connected to plate 52 which rotates relative to the central sprockets 158. Each of the movable sprockets 174 of sprocket pairs 166, 168 are pivotally connected to end 176 of a lever 178 having opposite ends 176 and 180. End 180 is pivotally connected to the opposite ends of a rocker 182 which is pivotally connected to plate 52. Rocker 182 midway between ends 176, 180 has secured to it a cam lever 184 which extends downwardly of the rocker towards sprockets 158. Cam lever 184 has a distal end 186 to which a cam roller 188 is pivotally connected. Cam roller 188 is positioned on cam 190 which is secured to sprockets 158 and plate 126 and drive flange 124. A spring 192 is secured between rocker 182 and plate 126 to bias cam roller 188 against cam 190.

Thus, movable sprocket 174 of pair 166 acts as tensioning sprocket and movable sprocket 174 of sprocket pair 168 functions as a timing sprocket. As the timing sprocket is moved away from the stationary sprocket 172 of pair 168, the tensioning sprocket is moved closer to the stationary sprocket 172 of pair 166 so as to maintain the tension of the chain as the accelerated movement of the end sprocket 165 is accomplished to rotate the bat fingers as described herein. As shown in FIG. 16, end sprockets 165 may be provided with a cover 194 secured to plate 52 so as to minimize the fouling of end sprocket 165 and the chains 152, 154 and 156.

In a specific embodiment, sprockets 158, 165 each are provided with thirty-six teeth and each of the sprockets of pairs 166 and 168 are provided with fifteen teeth to provide bat rod movement from about 1 to about 1.7 radians. In this embodiment 150, whatever number teeth, the central sprockets 158 are provided with the end sprockets having the same number of teeth and the bat rods 46 are each rotated one revolution as the bat assembly is rotated one revolution.

As an added feature, in combines in which the bat fingers or bat plates 48 may become wrapped with cut crop stalks, a bat finger unwrapping movement can be accomplished by providing end sprockets 165 with half the number of teeth of central sprockets 158. In this embodiment, each bat rod will accomplish two rotations for every single rotation of the bat reel assembly 18 and diametrically opposite the rotation of the bat fingers 48 adjacent the header 13, the bat rods 46 and the attached bat fingers 48 will rotate in the opposite direction one full rotation to unwind crop stalks and to free them from the bat assembly 18.

Figure 18:
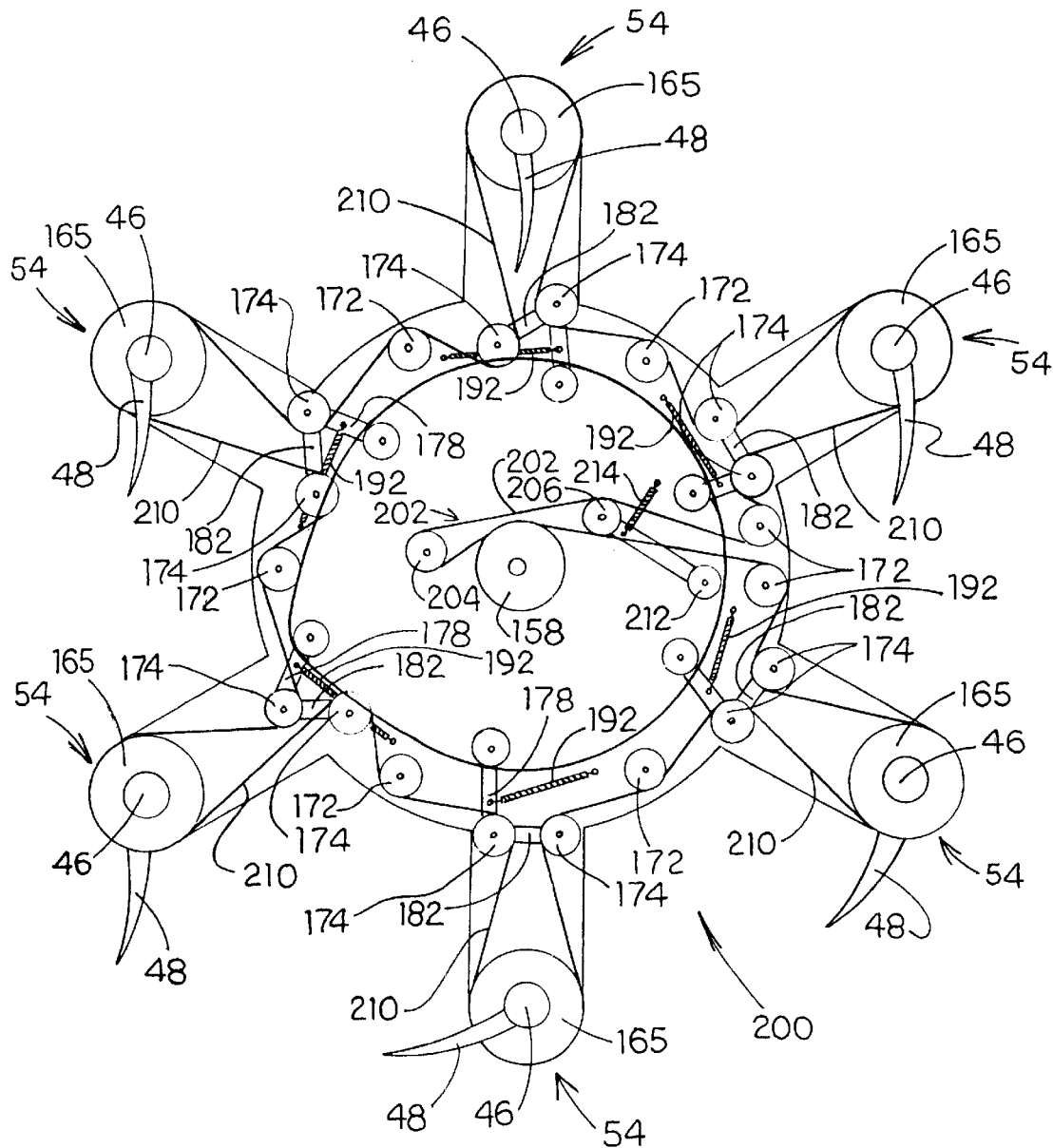

Referring now to FIG. 18, a modified version 200 of the bat drive systems 50 and 150 is shown. Like reference numerals will used to refer to like parts. This version 200 is similar to version 150 illustrated in FIGS. 16 and 17. The major difference between versions 150 and 200 is that version 150 includes three central sprockets 158 and three chains 152, 154 and 156 to drive the six circumferentially spaced apart bat drives 54. Like versions 50 and 150, version 200 may have more or less bat drives 54. In version 200 illustrated in FIG. 18, all six bat drives 54 are driven by a single chain 210, and adjacent bat drives 54 share a common stationary sprocket 172 of the sprocket pairs 166, 168, and thus, bat drives 54 maybe supplied in even or odd numbers. The cam lever 178 is shown to be pivotally connected to end 218 of rocker 182 instead of being secured at its midpoint. Additionally, chain reverse mechanism 202 is shown to include sprocket 204 pivotally connected to plate 52 and movable lever 208 pivotally connected at one end to plate 52 by pin 212. Sprocket 206 is pivotally connected to lever 208 at its distal and unattached end 218. Spring 214 biases sprocket 216 against chain 210. An additional stationary sprocket 206 is pivotally connected to plate 52 adjacent chain reverse mechanism 202. By being trained over sprockets 204 and 206 over central sprocket 158 and over sprocket 216, the chain is reversed in direction.

In a specific embodiment of version 200, central sprocket 158 has forty teeth, end sprockets 165 have forty teeth and stationary sprockets 172, 204, 206, 216 and movable sprockets 174 all have fifteen teeth. If it is desired to provide bat rods 46 the crop stalk unwinding feature above mentioned with regard to version 150, central sprocket 158 is provided with eighty teeth not forty such that bat rods 46 complete two revolutions every time that the bat reel assembly 18 completes one revolution. In specific embodiments of versions 150 and 200, rocker 182 may be exchanged between versions.

Figure 19:
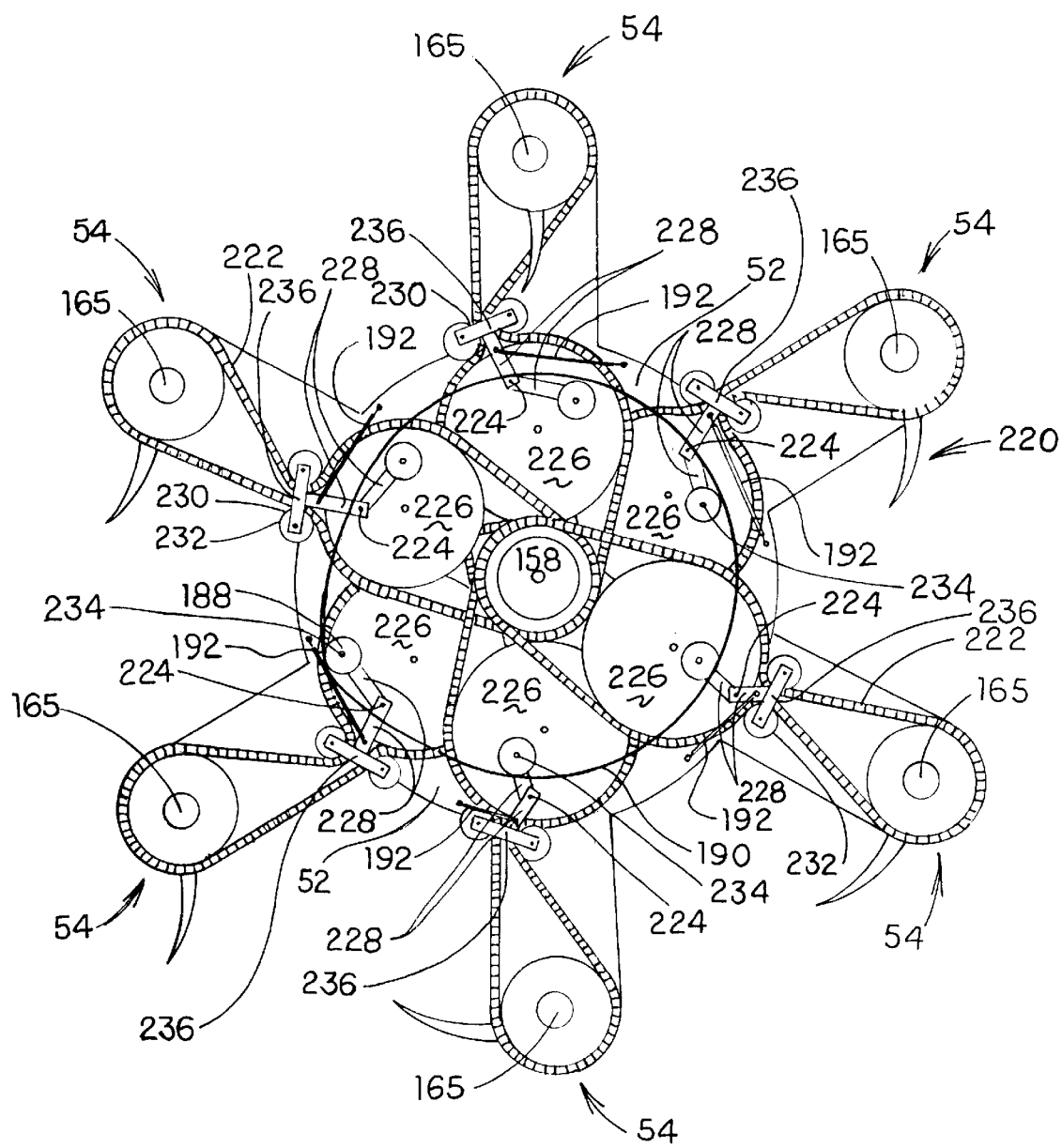

Referring to FIG. 19 a third chain driven version 220 is shown. In this version 220, each bat drive 54 is driven by a single chain 222 about a central sprocket 158. Again, like reference numerals will be used to refer to like parts, and any number of bat drives desired may be used if space permits. Large sprockets 226 are pivotally connected to plate 52 between central sprocket 158 and each end sprocket 165 by pin 224. Also pivotally connected to the plate 52 about pin 224 is cam lever 228 having a single sprocket pair 230 secured to one end 232 thereof. A cam roller 188 is pivotally connected at the other end 234 of lever 228; Cam roller 188 is biased against the cam 190 by a spring 192. The sprockets 236 of pair 230 are pivotally connected to lever 238 which extends transversely of lever 228 and end 232 and is secured thereto.

In this version 220, in a specific embodiment, central sprocket 158 is provided with thirty teeth, large sprocket 226 is provided with thirty teeth and end sprocket 165 is provided with thirty teeth.

Figure 20:
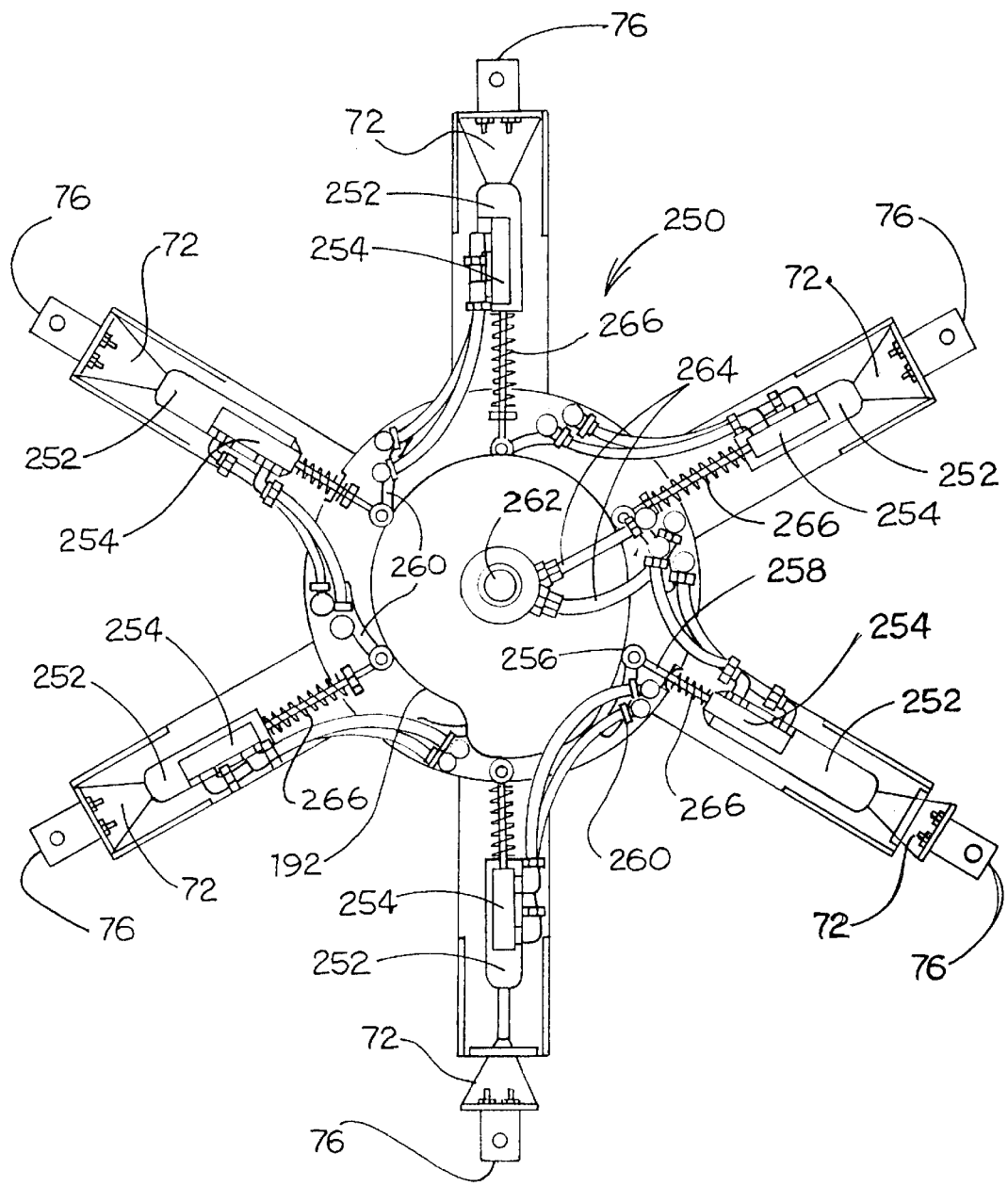

Referring to FIG. 20, another modified version 250 is disclosed. Again, like reference numerals will be used to refer to like parts; and any number of bat drives desired may be used if space permits. Modified version 250 uses a fluid driven (hydraulic or pneumatic) cylinder 252 in each bat drive 54 to move clamp 58 outwardly as in version 50. Bat clamp 58 is secured to the distal end of the extendible and retractable rod of the cylinder 252. Attached to the cylinder 252 is a fluid valve 254 which is opened and closed by a cam roller 256 secured to the valve lever 258 of valve 254. As the cam roller 256 rolls on the cam 140, the valve 254 is opened forcing fluid into the cylinder 252 and extending the clamp 58. In order to guide the movement of the valve lever 258, a guide lever 260 is pivotally connected to plate 52 at one end 261. A cam roller 188 is pivotally connected to the opposite end 263 of lever 260. A spring 266 extends around valve lever 258 to resiliently urge cam roller 256 against cam 190. Suitable fluid connections 264 are provided from the central hub 262 to each of the valves 254 to provide fluid to power cylinders 252.

In operation, combine 10 functions as any other conventional combines to harvest crop by moving against the crop. The crop is guided by the dividers 26 and the bat reel assembly 18 and the motion of the combine 10 toward the cutting bar 14. Cutting bar 14 cuts the crop and lays the crop on the header 13. The bat reel assembly 18 rotates from a position ahead of the header 13 to present the crop upstanding in front of the cutter bar 14 and to move the cut crop across the header 13 and into the grasp of the auger 16. Auger 16 then moves the cut crop into the harvester's grain bin 24.

The bat reel assembly is also conventional except for the bat drive system 50, 150, 200, 220, 250 of the invention. Each of the bats 44 include a bat rod 46 with either spaced apart bat fingers 48 secured thereto or a bat plate 48 as above described. The bats are spaced apart circumferentially so as to extend the full length of the bat assembly 18 with the bat rods 46 generally parallel to each other and circumferentially spaced about the central support. Each of the bat rods 46 are journaled for rotation relative to the bat reel assembly 18. The bat reel assembly itself is journaled for rotation by the drive chain 28.

Each of the bat drive systems 50, 150, 200, 220, 250 of the invention drive each of the bats 44 in essentially the same manner. As the bat reel assembly 18 is rotated, each of the bat rods 46 is rotated to maintain the bat fingers or the bat plates 48 generally vertically disposed toward the ground as is conventional. However, by the new and improved bat drive system 50, 150, 200, 220, 250 of the invention, the rotation of each of the bat rods 46 of the bat assembly 18 is rotated to position them spaced apart from the ground and in front of the cutter blade are accelerated in rotation so as to move the bat fingers or plates 48 from their essentially vertical position to fold the same inwardly toward the combine so as to allow the bat fingers or plates 48 to be positioned closely adjacent to the header until the bat fingers or plates 48 approach the auger 16 at which time the rotation is decelerated and reversed to position the bat fingers or plates 48 in their essentially vertical position once again. The accelerated rotation of the bat rods 46 allows for the header to be cleaned by each bat 44 and to move grain continuously into the auger and into the harvester's grain bin 24 at a more consistent rate. By this accelerated motion of the bat fingers or plates 48 to fold them out of their generally vertical position as they approach and move over the header 13, the crop is more efficiently moved into the combine leaving the field essentially swept free of cut crop more efficiently. Not only is the field cleaner of crop when using the combine 10 of the invention, but the crop is fed more continuously at a more even rate into the combine. Conventionally, with combines of the type to which the invention pertains, one can listen to repeated revs of the motor as the combine is moving across the field. The motor is accelerated and decelerated repeatedly as the crop is fed into the processor. Since the crop is fed unevenly and not continuously, bunches of cut crop are fed into the auger causing the motor of the combine to accelerate when little or no cut crop is fed into the combine between large clumps of crop. Surprisingly, the cut crop is fed into the combine 10 of the invention so evenly by the invention, that the engine is not noticeably accelerated or decelerated during operation and the combine 10 will experience over a twenty percent fuel saving during use. In a specific embodiment, the fuel saving will range between 20 and 30 percent of conventional.

The folding of the bat fingers or plates 48 of each of the bats 44 as they approach the cutter bar 14 and move over the header 13 is best illustrated by reference to FIGS. 3–5. FIGS. 3 and 5a show the bats 44 as they approach the cutter bar and move over the header in spaced apart relation with each of the bat fingers or trowel maintaining its generally vertical position. This conventional bat assembly moves the crop into the cutter bar but is so far spaced from the header, allows crop to accumulate on the header and later to be fed in bunches to the auger 16 causing the aforementioned acceleration/deceleration of the combine engine as it passes over the field. In use, many times, the fingers or plates 48 of each of the bats 44 are spaced from the header from about 6 inches to about 15 inches to prevent the fingers or plates 48 from breaking upon impact of the header as the header floats and follows the contours of the field. See FIG. 5a in which the motion of the finger tips is shown by dashed line 270. Generally, header 13 may move between six to twelve inches to accommodate irregularities in the field.

FIGS. 4 and 5b illustrate how the fingers or plates 48 are folded as they approach the cutter bar 14 and move in a folded condition over the header 13 and are then rotated into their generally vertical position as they pass upwardly adjacent to the auger 16. In this folded condition, bats 44 can be positioned from about 2 inches to about 1 inch above the cutter bar without experiencing finger breakage or bat damage. See FIG. 5b in which the motion of the finger tips is shown by dashed line 272. By this movement of the fingers or plates 48 over the header and in front of the auger, the dead space 274 in front of the auger in which cut crop usually accumulates is vastly reduced. With a conventional bat system, the dead space 274 between the header 13 and the bat reel assembly 18 may be from about 10 to about 15 inches. In a specific embodiment in which the new and improved drive system for the bat reel assembly of the invention is utilized, this dead space 274 in front of the auger 16 may be reduced to 4 to 6 inches. With the bat fingers or plates 48 positioned that close to header 13, a floating header 13 may still strike the fingers as the header 13 moves to accommodate irregularities in the field. However, by the new and improved drive system for the bat reel assembly of the invention each of the fingers or plates 48 are moved out of their at rest position upon impact against the resiliency of springs 94, 192 and 266 in versions 50, 150, 200 and 250, respectively. Thus, unless the bat fingers or plates 48 are hit by the header 13 top dead center, no bat finger or plate 48 breakage will occur. The bats 44 in each of the embodiments of the invention not only present the crop to the cutter bar in an upright condition, but effectively and efficiently sweep the header clean of cut crop and present cut crop to the feed auger in a continuous and even manner at a more constant rate, thus accomplishing the higher efficiency of operation of the combine as above described.

An additional benefit of the invention in FIG. 5b is that the fingers, in the folded condition being about 2 inches to about 1 inch above the cutter bar, are also closer to the surface of the field such that the folded fingers are able to lift fallen stalks and grain from the ground for cutting by the cutter bar, whereas if the fingers were at a height conventionally seen in a combine reel, fallen stalks and grain on the ground would not be presented for cutting and would go as lost harvest. The folded fingers additionally comb through crop to properly prepare and position it for cutting, whereas a combine reel not having the present invention would simply rake through the crop.

Referring now to FIGS. 6–8, the operation of bat drive system 50 of the invention will now be described. In this drive system 50, a plurality of circumferentially spaced apart bat drives 54, which are fully illustrated in FIGS. 9–12, are secured to plate 52 which is secured to the bat assembly 18 and rotates with the bat assembly 18. Each of the bat drives are spaced circumferentially around the plates 52 to form diametrically opposite pairs of bat drives as explained herein above. Each of the bat drives 54 has a bat cam lever 72 therein which moves essentially radially outwardly of the plate 52 whenever the bat rod 46 of a particular bat is accelerated in rotation to fold the bat fingers or plate 48 inwardly toward the combine 10 as above described. Each of the bat cam levers 72 has at its distal end 74 a clamp 58 which is secured through a operative lever 60 to the bat rod 46 of each bat. Thus, each bat rod 46 rotates in its conventional fashion to maintain the bat fingers or plates 48 in a generally vertical position until the cam lever 72 is moved into its extended position 88 at which time lever 60 is rotated to accelerate the rotation of bat rod 46 to fold the bat fingers or plates 48 inwardly of the combine as above described.

Bat cam lever 72 at end 76, opposite the distal end 74 which is pivotally connected to the bat operating lever 60, has cam rollers 80, 81 secured thereto on opposite sides thereof and a cam spacer lever 78. Cam rollers 80, 81 are positioned on opposite sides of plate 52 to engage cams 128 and 140, respectively. Cams 128, 140 are secured to plate 126 which is secured to the bat assembly drive flange 124 and thus, do not rotate with the bat assembly 18. Thus, as the plate 52 rotates relative to the cam 128, the cam rollers 80 move on the cam 128 as shown in FIG. 6 to maintain each of the bat cam levers in their retracted position 90 with the roller pin 79 adjacent end 91 of slot 92 in plate 52 and slot 120 in the plate 64 and slot 120 in the plate 52 of the bat drive 54. Cam rollers 80 are released from the cam 128 over about one quarter of each revolution as shown in FIG. 6. The extension of the bat cam lever 72 of bat drive 52 then is controlled by the engagement of cam roller 81 on cam 140 which is shown in FIG. 7. Cam 128 is generally coaxial of the axis of rotation of plate 52, the cam 140 is not. Thus, cam 140 gradually moves the bat lever 72 and its secured clamp 58 at its distal end 74 radially outwardly of plate 52 to rotate lever 60 and to accelerate the rotation of bat rod 46 to fold the bat fingers or plates 48 inwardly of the combine 10 as above described. Cam 140 is actually the peripheral edge of cover 136 which closes drum 134 and encloses the rollers 132 which support plate 52 for rotation relative to plate 126 are positioned. The rollers 132 within the drum 134 are shown in FIG. 8 as the cover 136 and cam 140 are removed.

Lever 78 of each bat drive 54 is secured to the adjacent bat drive 54 and plate 52 such that it may rotate about its securance and maintain pin 79 on which cam rollers 80, 81 are journaled midway between the opposite sides of slots 92 and 120 so as to prevent any binding of the movement of cam rollers 80, 81 between the opposite ends of slots 92 and 120. Slots 92 and 120 are arcuate and have a radius essentially equal to the length of cam lever 78.

Referring to FIGS. 9–12, each of the bat drivers 54 is shown in detail. Bat cam lever 72 adjacent its distal end 74 is triangular in shape having opposite cam edges 82, 84 which guide the movement of lever 72 between its extended position 88 shown in FIG. 9 and its retracted position 90 shown in FIGS. 10 and 11. Lever 72 moves between plates 62 and 64 and spacers 68 within passage 70. When lever 72 is extended, pin 98 which is secured to lever 72 is engaged by lock lever 106 to secure lever 72 in its extended position. Plate 64 is cut-away at 100 to allow lever 72 and its extended pin 98 to move into its retracted position 90. When extended pin 98 is not engaged with lock lever 106, spring 112 returns lock lever 106 into its unlocked position 110 as shown in FIG. 11. Spring 94 which extends between cam lever pin 98 and mounting pin 96 maintains cam rollers 80, 81 in engagement with cams 128, 140 throughout the movement of bat cam lever 72 between its retracted position 90 and its extended position 88. Cam 140 also locks and unlocks lock 106. Thus, as each bat driver 54 is moved from its collapsed position 90 to its extended position 88, cam 140 urges cam lever 72 into its extended position 88 by moving pin 79 from end 91 toward end 93 of slot 92. As that motions continues, spring 94 is extended and pin 98 moves past lock 106 and thus as cam 140 allows bat cam lever 72 to retract pin 98 becomes positioned within depression 142 of lock lever 106 and bat cam lever is locked into position 88.

Cam 140 at the appropriate time moves bat cam lever 72 back into its collapsed position 90 whereby lock lever 106 is urged by spring 112 back into its unlocked position so as to free bat cam lever 72 which is then retracted by cams 140 and 128 into its collapsed position 90. By this movement of extending bat cam lever 72 between its collapsed position 90 and its extended position 88, the rotation of each bat rod 46 is accelerated by the operational lever 60 pivotally secured to the securance clamp 58 at the end of each bat cam lever 72 so as to rotate the bat fingers or trowels 48 as described herein.

Referring to FIG. 20, version 250 is shown to have a cam lever 72 somewhat shortened and secured to the rod of a conventional fluid operated cylinder 252. The operation of versions 50 and 250 are somewhat similar. When cylinder 252 is actuated, bat cam lever 72 is extended into its extended position 88. When cylinder 252 is not activated, bat cam lever 72 is retracted into its retracted position 90 by its bias. Bat cam lever 72 in this version is also connected to a clamp 58 which is secured to an operative lever 60 which is secured to bat rods 46 as above described. When a cylinder 252 is actuated by fluid valve 254 actuating rod 258 extends radially toward the axis of rotation of plate 52 and hub 262. Valve control rod 258 has a distal end to which a cam roller 256 is secured and journaled around a pin which extends through lever 260. Cam 140 of cover 136 thus actuates valve 254 to extend or retract cam lever 72 thus moving valve lever 258 into its retracted position allows fluid to flow into cylinder 252 to extend cam lever 72 radially outwardly. Likewise, the extension of valve lever 258 to its extended position cuts off all fluid flow into valve 254 causing cam lever 72 to return to its retracted position. Valve lever 258 is resiliently urged into its extended position by spring 266. Valve 254 is connected to a fluid supply by hoses 264 as is conventional. A pressurized fluid supply is mounted to the frame 34 of the combine 10 and is delivered to each cam driver through the hub 266 by hoses 264 as shown in FIG. 20.

Versions 150, 200 and 220 are each chain driven bat drive systems of the invention. In operation, version 150, as shown in FIGS. 16 and 17, utilizes a single chain for each pair of diametrically opposed bat drives 164. Version 200, as shown in FIG. 18, illustrates use of a single chain to drive all six bat drives 164. Version 220, as shown in FIG. 19, illustrates the use of a separate chain to drive each of the bat drives 164.

Referring now to FIGS. 16 and 17 and embodiment 150, each of chains 152, 154 and 156 are trained about a central sprocket 158, respectively, which are secured to plate 52 and drive flange 124, respectively. Each of the chains 152, 154, 156 are trained about end sprockets 165 of diametrically opposite bat drives 54 and sprocket pairs 166, 168 as shown in FIGS. 16 and 17. Each of the sprocket pairs 166, 168 has a movable sprocket which is connected by sprocket levers 178 to rocker 182. Cam lever 184 of rocker 182 has at its distal end 186 a cam roller 188 which travels along cam 190 which is also secured to bat assembly drive flange 124. Thus, both sprockets 158 and cam 190 are stationary with respect to plate 52 and each of the bat drives 54 which rotate relative thereto.

As the bat reel assembly 18 rotates, plate 52 rotates with each of the bat drives 54 secured thereto. As the bat assembly 18 rotates, each of the bat rods 46 rotate to maintain the alignment of fingers or plate 48 in their generally vertical position. Each of the bat rods 46 are secured to end sprockets 165 of their respective bat drives 54. With the movement of rocker 182 relative to the plate 52, each of the bat rods 46 rotate to maintain the bat fingers or plates 48 in the generally vertical position above described.

Each bat 54 has a sprocket pair 166 and a sprocket pair 168. Each pair has a stationary sprocket 172 which is pivotally secured to plate 52. Each of the sprocket pairs 166, 168 also has a movable sprocket 174 which is pivotally secured to a sprocket lever 178 which in turn is pivotally secured to rocker 182 allowing the movable sprocket 174 to move from a position adjacent stationary sprocket 172 to a position remote from stationary sprocket 172 as the rocker 182 rotates about its pivotal connection to plate 52 in response to the cam roller 188 following the cam 190 and transmitting its position via the cam lever 178 to the rocker 182. As one of the movable sprockets 174 is moved away from its stationary sprocket 172 the other movable sprocket 174 is moved toward its stationary sprocket 172 to maintain the tensioning of the chain about all of the sprockets 158, 165, 172, 174 of each bat drive 164.

As the bat reel assembly 18 rotates, bat plate 52 positions one of the bat drives 164 and its respective bat 44 in front of the cutter bar 14 and the cam roller 188 moves the cam lever 184 to rotate rocker 182 in order to move the movable sprocket 174 of sprocket pair 166 apart from each other and to move the movable sprocket 174 of sprocket pair 168 closer to each other to accelerate the rotation of end sprocket 165 to fold the bat fingers or plate 48 of the bat 44 inwardly toward the combine as above described. Similarly, as the fingers or plate approach the auger 14, the rocker 180 is moved by the cam roller 188 on the cam 190 in the opposite direction to decelerate the rotation of end sprocket 165 to reposition the fingers or plate 48 in its generally vertical position for the remainder of the rotation of the bat assembly.

Referring now to FIG. 18, the operation of version 200 will now be described. In this version, rocker 182 is provided with movable sprockets secured to each end of the rocker 182 and a cam roller 188 pivotally connected to the distal end of cam lever 184 which is partially secured to rocker 182 at end 170 thereof. A stationary sprocket 172 is located between each pair of bat drives 164 and a single chain is trained about a single sprocket 152 and stationary and movable sprockets 172, 174. So that chain 152 does not reverse the rotation of the end sprockets 165 of the six bat drives 164 shown in FIG. 18, the chain is trained around a chain reverse mechanism 202 which includes stationary sprocket 204 and a movable sprocket 206 which is pivotally connected to end 212 of lever 208. Lever 208 is pivotally connected to the plate 52 by pin 212 and biased by spring 244 to maintain the tension of chain 210, stationary sprocket 204, movable sprocket 206 and stationary movable sprockets 172, 174 of sprocket pairs 166, 168 and central sprocket 158. In a specific embodiment of version 200, central sprocket 158 has forty teeth, end sprocket 165 has forty teeth in the version in which bat rods rotate one revolution for each revolution of bat reel assembly 18. In the version in which bat rods 46 rotate two revolutions for each revolution of bat reel assembly 18 to unwind cut crop from the bats 44, sprockets 158 will be provided with eighty teeth.

Version 200 functions to accelerate the rotation of bat rods 46 in the manner above described with regard to version 150 to fold fingers or plates 48 as they pass over header 13 in the same manner as above described, by cam rollers 188 at the end of cam lever 184 rotating rocker 182 to accelerate the rotation of end sprocket 165 as shown in FIG. 18.

Referring now to FIG. 19 and version 220 of the bat drive system of the invention, the operation of version 220 will be described. In version 220, a single chain 222 is utilized to drive each of the end sprockets 165. In this version, there is a central sprocket 158 and a large mediate sprocket 226 for each end sprocket 165. Thus, for each end sprocket 165, there is a central sprocket 158 and a large intermediate sprocket 226 as shown in FIG. 19 with a chain 222 trained about sprockets 158, 226, 165 and between a sprocket pair 230. Sprocket pair 230 has a pair of sprockets 236 pivotally connected to a bar 238 which is secured to a cam lever 228 having at its distal end 234 a cam roller 188. Cam roller 188 travels along cam 190 so as to move cam lever 188 which is pivotally connected to plate 52 on the same pin 224 as connects large sprocket 226 to plate 52 so as to rotate the sprocket pair 230 to accelerate and decelerate the rotation of end sprocket 165.

In specific embodiments of each of the chain driven versions of 150, 200 and 220, the folding of the fingers or trowel 48 may be accomplished by rotation out of the essentially vertical position of fingers or trowel 48 approximately 90°. Similarly, both the fluid power cylinder version 250 and the mechanical version 50 when appropriate cylinders 252 and lengths of operative levers 60 are chosen will rotate end sprockets 165 so as to position fingers or trowel 48 at least 90° from their generally vertical at rest position.

By the invention, a new and improved drive system for the bat assembly of a conventional combine header is provided by which the bat assembly is driven to properly present crops for cutting and the cut crops are consistently and evenly fed into the auger. The bat assembly driven by the new and improved drive system of the invention cooperates with the floating header to provide improved feed into the auger and at the same time to reduce bat finger breakage and combine down time. With the invention, cut crop is fed into the auger at a more consistent rate and combine operational costs may be reduced up to twenty percent.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A combine having a header bottom ahead of a crop feed auger, said header having a cutter bar at its leading edge, and a bat reel assembly comprising a reel and a plurality of bats which rotate above and in front of the header and cutter bar to move crop into the cutter bar and cut crop into the auger comprising bat drive assembly having a first plate secured to said combine, a second plate spaced from said first plate and mounted for rotation with said bat assembly relative to said first plate, a plurality of bat drives secured to said second plate and circumferentially spaced about said second plate, said bat drives extending diametrically of said second plate and said bat assembly, said first plate having at least one cam attached thereto, each of said bat drives having at least one cam follower, said cam follower engaged with said cam to move a bat drive linkage in response to the movement of said cam follower in accordance with said cam and to accelerate the rotation of said bat rods relative to said bat reel to move said bats from an essentially vertical at rest position to an essentially horizontal position as said bats pass over said header and back to said essentially vertical position and said bats pass the front of said auger in rotation of said bat assembly, said bat reel assembly including a plurality of bat rods extending generally horizontally lengthwise of said bat assembly, each of said bat rods being connected to a bat drive adjacent to at least one of its opposite ends, each of said bat rods having a bat attached thereto, whereby said bats draw said grain to said cutter bar and sweep the cut crop over said header and into said auger relatively continuously.

2. The combine of claim 1 wherein said bats are accelerated through a rotation of less than 90°.

3. The combine of claim 1 wherein each of said bat rods rotate a single revolution as said bat reel assembly rotates a single revolution.

4. The combine of claim 1 wherein said bat rods rotate two revolutions for each revolution of said bat reel assembly, one of said revolutions being in the opposite direction thereby to unwind cut crop around said bat rods.

5. The combine of claim 1 wherein said bat drives are chain driven.

6. The combine of clam 1 wherein said bat drives are pressurized fluid driven.

7. The combine of claim 1 wherein said bat reel and bat drive assembly is chain driven.

8. The combine of claim 1 wherein said bats are biased into said essentially vertical at rest position and said essentially horizontal position, said bats being movable from both said essentially vertical at rest position and said essentially horizontal position urging the resiliency of a spring upon impact with said header.

9. The combine of claim 1 wherein each of the bat rods are rotated continuously as said reel bat assembly is rotated to maintain the bats in a generally vertical position, said bat rods being accelerated and decelerated over about 180° of said bat reel assembly rotation to rotate said bat rods less than about 90° rotation.

10. The combine of claim 1 wherein said accelerated bat rotation is achieved by a sprocket secured to said bat rod, said sprocket being chain driven over 180° of said bat reel assembly rotation and being accelerated driven less than 180° of said bat reel assembly rotation.

11. The combine of claim 1 wherein each of said bat rods are pivotally connected to a bat lever, said bat levers having opposite ends, said bat rods being connected at one of said ends, the other of said ends being pivotally connected to said bat drives, said bat drives being movable from and extended position to a retracted position, said moving of said bat drives from said retracted position to said extended position accelerating the rotation of said bat rods, said movement of said bat drives from said extended position to said retracted position decelerating said bat rod rotation.

12. The combine of claim 1 wherein each of said bat drives includes a pair of bat drive plates secured to each other in a spaced apart fashion defining a passage way there between, a bat lever rod positioned in said passageway for movement between a retracted position and an extended position, said bat lever rod having a pair of cam rollers secured at one end, said cam rollers being positioned on opposite sides of said bat lever rod, a bat clamp being secured to the other end of said bat lever rod, a spring urging said bat lever rod into its retracted position, and a lock for locking said bat lever rod in its extended position.

13. The combine of claim 12, wherein each of said bat drives includes a slot in at least one of said bat drive plates, a cam pin extending through said slot, said cam rollers being secured to said cam pin on opposite sides of said at least one bat drive plate, said rollers engaging said at least on cam and a second cam on opposite sides of said at least one bat drive plate, a cam lever maintaining said pin in spaced apart relationship with the sides of said slot, said cams moving said cam lever between its extended position and its retracted position, one of said cams engaging said lock in its extended position and disengaging said lock, said cam lever having camming surfaces thereon for guiding said cam lever into its retracted position.

14. The combine of claim 12 wherein said bat drives include an end sprocket mounted for rotation to said bat lever rod, a central sprocket secured to said first plate, and two pair of intermediate sprockets, one of each pair of intermediate sprockets being pivotally connected to said second plate, the other of said intermediate sprockets being pivotally connected to a lever pivotally connected to a rocker arm, said rocker arm being pivotally connected to said second plate, said rocker arm having a cam lever extending therefrom, said cam lever having a distal end, a cam roller pivotally connected to said cam lever distal end, a cam secured to said first plate, said cam surrounding said central sprocket, a chain trained around said central sprocket and said two pair of sprockets and said end sprockets of diametrically opposite bat drives, said chain being driven by the rotation of said second plate so as to rotate said end sprocket, said cam lever pivotally rotating said rocker to accelerate the movement of said chain about said end sprocket when desired, one of said pair accelerating said chain movement, the other of said pair maintaining the tension of said chain on all of said sprockets.

15. The combine of claim 14 wherein there are six bat drivers secured to said movable plate, there being three central sprockets, six end sprockets, twelve sprocket pairs, and three chains to drive six bat rods of said bat reel assembly.

16. The combine of claim 12 wherein each of said bat drives include an end sprocket secured to said bat lever rod and mounted for rotation relative to said second plate, one central sprocket is secured to said first plate, and a pair of movable sprockets being connected to a rocker arm at its opposite ends, said rocker arm being pivotally connected to said second plate and having a lever arm secured thereto, said lever arm having a distal end and a cam roller pivotally connected to said distal end, said cam roller being resiliently urged against a cam, a stationary sprocket secured to said second plate between each rocker arm, and one chain being trained over said central sprocket and each of said end sprockets and each of said sprocket pairs and each of said stationary sprockets.

17. The combine of claim 16 further comprising a chain reversing structure to train said chain around said central sprocket in between two of said sprocket pairs of adjacent bat drivers.

18. The combine of claim 12 wherein each of said bat drives includes an end sprocket mounted for rotation relative to said second plate, a central sprocket secured to said first plate, and an intermediate sprocket fixed to said second plate, a pair of sprockets positioned adjacent said intermediate sprocket and connected to a lever arm pivotally connected adjacent said intermediate sprocket to said second plate, said lever arm having a distal end with a cam roller pivotally connected thereto, said cam roller being resiliently urged against a cam so as to accelerate the rotation of said end sprocket when desired by moving said sprocket pair circumferentially of said intermediate sprocket, a chain being trained about said central sprocket and said intermediate sprocket and said sprocket pair and said end sprocket for each of said bat drives.

19. The combine of claim 11 wherein each of said bat drives has a bat lever secured to a fluid driven cylinder, a fluid valve secured to said cylinder and connected to a pressurized fluid source, said fluid valve being actuated by a cam lever having a distal end which has secured thereto a cam roller, said cam roller also being pivotally secured to a cam lever which is remotely secured to said second plate, said cam roller being resiliently urged against a cam whereby said cam opens and closes said valve to actuate said fluid cylinder to move said cam lever rod between its extended position and its retracted position.

20. A combine having a transversely extending header, said header having a leading edge, a cutter bar extending along said leading edge of said header, a transversely extending auger positioned rearwardly of said header, said header and said auger being secured to a combine frame, a bat reel assembly being mounted on said frame, said assembly having a plurality of circumferentially spaced apart bats, each of said bats having a transversely extending bat rod and a plurality of spaced apart bat fingers each having a distal end and each being secured to said bat rod, each of said bat rods being rotationally mounted to said bat reel assembly, said assembly and each of said bat rods having independent, generally parallel axes of rotation, said assembly being rotatable in a forward direction, said bat rods being rotatable in both said forward direction and a rearward direction opposite from said forward direction, at least one bat drive system being connected between said combine frame and one end of said bat reel assembly, said bat drive system driving the rotation of said assembly and the rotation of each of said bat rods independently of the rotation of said assembly whereby each of said bat rods may be rotated in said forward and rearward directions independently of said assembly and the other bat rods at any rotary position of said assembly.

21. A combine of claim 20 wherein said bat drive system is configured to generate a cyclical rotation of each of said bat rods about its said axis of rotation, each cycle of said rotation being dependent upon the position of each of said bat rods relative to the rotation of said assembly about its own axis, in which each of said bat rods rotate (i) in said forward direction to orient said fingers on said bat rod generally perpendicular to said header as said bat rod rotates relative to said axis of said assembly toward the ground, then (ii) in said forward direction to orient said fingers such that said distal end of each said finger on said bat rod points generally at said auger as said bat rod rotates relative to said axis of said assembly toward said auger, then (iii) in said rearward direction to orient said fingers generally vertically as said bat rod rotates relative to said axis of said assembly upwardly and away from said auger, and then finally (iv) in said rearward direction is required to maintain the orientation of said fingers generally vertically until said cyclical rotation begins anew; wherein said assembly rotates to cause each said bat rod and each said finger to engage a crop for presenting it for cutting by said cutter bar and placement of cut crop upon said header, said cyclical rotation of each said bat rod orienting said fingers on said bat rods for maximum engagement of said fingers with said cut crop to provide a consistent feed of said cut crop from said header into said auger and to avoid contact of said fingers with said cutter bar, said header, said auger, the ground and said combine frame for minimum wear and tear and breakage of said fingers in use.

22. The combine of claim 20 wherein each of said bat rods may be rotated a full 360° C. or less independently of the other bat rods at any rotary position of said assembly.

23. A bat reel assembly of a combine, comprising: a reel, a plurality of bat rods extending generally horizontally lengthwise of said bat reel assembly, each of said bat rods having a at attached thereto, and a bat drive assembly connected to said bat reel assembly adjacent each of its opposite ends, each said bat drive assembly comprising a first plate secured to said combine, a second plate spaced from said first plate and mounted for rotation with said bat reel assembly relative to said first plate, a plurality of bat drives secured to said second plate and circumferentially spaced about said second plate, said bat driving extending diametrically of said second plate and said bat reel assembly, said first plate having at least one cam attached thereto, each of said bat drives having at least one cam follower, said cam follower being engaged with said cam to move a bat drive linkage in response to the movement of said cam follower in accordance with said cam and to accelerate the rotation of said bat rods relative to said second plate to move said bats from an essentially vertical at-rest position to an essentially horizontal position as said bats pass through a predetermined position relative to said combine whereby said bats draw grain for cutting and sweep cut crop into said combine relatively continuously.

24. A method for preventing the impact of bat fingers with the ground and the structural members of a combine having a header, comprising the steps of:

proving said bat fingers on a rotatable bat rod extending transversely of a generally cylindrical bat reel assembly mounted on said combine, said bat fingers being rotatable with said bat rod and having a generally vertical at-rest position; accelerating the rotation of said bat fingers in a forward direction to cause said bat fingers to orient generally perpendicularly to said header as said bat rods rotate toward the ground and toward a cutter bar mounted to said combine; accelerating the rotation of said bat fingers in said forward direction as said bat rods sweep across the ground and toward an auger mounted to said combine behind said cutter bar to sweep cut crop into said auger relatively continuously; accelerating the rotation of said bat fingers in said rearward direction as said bat rods rotate away from the ground and from said auger to release cut crop caught in said bat rods; and rotating said bat rods to orient said bat fingers in said at-rest position.

* * * * *